United States Patent [19]
Moriya

[11] Patent Number: 5,769,044
[45] Date of Patent: Jun. 23, 1998

[54] VALUE PERFORMANCE CONTROL APPARATUS FOR INTERNAL COMBUSTION ENGINE

[75] Inventor: Yoshihito Moriya, Nagoya, Japan

[73] Assignee: Toyota Jidosha Kabushiki Kaisha, Toyota, Japan

[21] Appl. No.: 862,885

[22] Filed: May 23, 1997

[30] Foreign Application Priority Data

May 24, 1996 [JP] Japan .................................. 8-130095

[51] Int. Cl.$^6$ ............................... F02D 13/02; F01L 1/34
[52] U.S. Cl. .................................. 123/90.17; 123/90.31
[58] Field of Search ............................ 123/90.12, 90.15, 123/90.17, 90.31

[56] References Cited

U.S. PATENT DOCUMENTS

| 5,247,914 | 9/1993 | Imai et al. | 123/90.17 |
| 5,611,304 | 3/1997 | Shinojima | 123/90.17 |

FOREIGN PATENT DOCUMENTS

| 4-228843 A | 8/1992 | Japan . |
| 7139327 A | 5/1995 | Japan . |

OTHER PUBLICATIONS

Patents Abstracts of Japan, vol. 18, No. 613 (M–1709), Nov. 22, 1994 & JP 06 235307 A (Nissan Motor Co., Ltd.), Aug. 23, 1994.

Patent Abstracts of Japan, vol. 17, No. 486 (M–1473), Sep. 3, 1993 & JP 05 118232 A (Toyota Motor Corp.), May 14, 1993.

*Primary Examiner*—Weilun Lo
*Attorney, Agent, or Firm*—Kenyon & Kenyon

[57] ABSTRACT

An apparatus for controlling valve performance of an internal combustion engine. The apparatus includes a first changing means for changing the valve performance of an intake valve. The first changing means is actuated by fluid pressure. A second changing means changes the valve performance of an exhaust valve. The second changing means is actuated by the fluid pressure. A fluid source is connected with the first changing means and the second changing means to supply fluid to the first changing means and the second changing means. An adjusting means adjusts the amount of the fluid supplied from the fluid source to the first changing means and the second changing means. A detecting means detects the running condition of the engine. A control means controls the adjusting means to change each valve performance so as to coincide the engine torque with the desired engine torque. The control means includes selecting means for selecting one of the valves based on the detected running condition of the engine. The selected valve is capable of coinciding the engine torque with the desired torque faster than the other one of valves to allow a larger amount of the fluid supplied to one of the changing means that is associated with the selected valve than the other one of the changing means.

12 Claims, 11 Drawing Sheets

5,769,044

VALUE PERFORMANCE CONTROL APPARATUS FOR INTERNAL COMBUSTION ENGINE

BACKGROUND OF THE INVENTION

1. Field of the Invention

The present invention relates to a valve performance control apparatus for an internal combustion engine, which controls the valve performance of intake valves and exhaust valves provided in an internal combustion engine, such as the opening and closing timings of the valves, in accordance with the running condition of the engine.

2. Description of the Related Art

Each intake valve or exhaust valve in an internal combustion engine is reciprocatively driven by the rotation of the camshaft to periodically open and close the associated intake port or exhaust port, which is communicates with the associated combustion chamber of the engine. As the intake valve opens, air-fuel mixture is drawn into the combustion chamber through the intake port. The gas produced by combustion in the combustion chamber is discharged from the chamber through the exhaust port as the exhaust valve opens.

In a typical internal combustion engine, the times at which the individual ports are opened and closed by the associated valves are determined by the profiles of the cams of the associated camshafts.

To improve the output power or the performance of an internal combustion engine, some schemes have recently been proposed to alter the timing of opening and closing the valves, i.e., the valve timing, in accordance with the running condition of the engine. Japanese Unexamined Patent Publication No. 4-228843 discloses an example of such an intake/exhaust control apparatus for an internal combustion engine.

The control apparatus will be discussed below. As shown in the schematic structural diagram of FIG. 15, the control apparatus includes an intake camshaft 101, an exhaust camshaft 102, variable valve timing (VVT) mechanisms 103, 104, which are respectively provided on the ends of the camshafts 101, 102, a hydraulic pressure circuit 105 for supplying oil into the VVTs 103, 104, and an electronic control unit (ECU) 108.

Pulleys 109, 110 of the VVTs 103, 104 are respectively coupled to the crankshaft (not shown) of an engine (not shown) via a timing belt (not shown). The pulleys 109, 110 transmit the torque of the crankshaft to the camshafts 101, 102, respectively.

Each camshaft 101, 102 has a plurality of cams 111, 112, respectively, which cause the reciprocative motion of the corresponding intake valve or the exhaust valve in accordance with the rotation of the camshafts 101, 102. The intake valve or the exhaust valve opens and closes the corresponding intake port (not shown) or the exhaust port (not shown).

Each VVT 103, 104 has a pair of pressure chambers (not shown) formed therein where oil is supplied via the hydraulic pressure circuit 105. The pressure of the oil supplied to the pressure chambers causes the associated VVT 103, 104 to rotate relative to the pulley 109, 110 of the associated camshaft 101, 102. As a result, the relative rotational phase of the camshaft 101, 102 with respect to the crankshaft changes and alters the valve timing of the associated intake valve or the exhaust valve.

The hydraulic pressure circuit 105 has an oil pan 113 for retaining oil, an oil pump 114, which is driven by the crankshaft (not shown) of the engine, and an oil filter 115. The oil pump 114 supplies the oil in the oil pan 113 to the individual pressure chambers of the VVT 103, 104 via respective passages 106a, 106b and 106c, 106d. Electromagnetic valves 107a, 107b, 107c, 107d are arranged in the passages 106a, 106b, 106c, 106d, respectively, to open and close the associated passages 106a–106d and adjust the amount of oil to be supplied to the individual pressure chambers.

Various sensors 116, including an engine speed sensor, output detection signals to the ECU 108 in accordance with the running condition of the engine (not shown). The ECU 108 controls the individual electromagnetic valves 107a–107d based on the detection signals. This enables the control apparatus to optimize the valve timing of each valve in accordance with the running condition of the engine.

The control apparatus supplies oil to the VVTs 103, 104 from the common oil pump 114. Therefore, the amount of oil supplied to each VVT 103, 104 when oil is supplied to both VVTs 103, 104 to drive the VVTs 103, 104, simultaneously, is reduced as compared with the case where only one of the VVTs 103, 104 is driven. Accordingly, the amount of oil supplied to the VVTs 103, 104 may sometimes be insufficient. This may slow the operational speed of the VVTs 103, 104 and thus may slow the speed of altering the valve timing of the individual valves. Therefore, it may be difficult to quickly change the valve timing of each valve to the optimal timing in response to a change in the running condition of the engine. This may slow the valve timing control response.

As a solution to this shortcoming, the discharge performance of the oil pump 114 (the discharge amount per unit time) may be increased to prevent the valve timing control response from becoming slow. Since the oil pump 114 is normally driven by the crankshaft, this structure increases the driving resistance of the crankshaft, reducing the net output of the engine. The structure further results in a larger oil pump 114. This leads to a larger engine.

SUMMARY OF THE INVENTION

Accordingly, it is an objective of the present invention to provide a valve performance control apparatus for an internal combustion engine, which has a pair of mechanisms for changing the valve performance of intake valves and exhaust valves in an internal combustion engine, and supplies fluid to both mechanisms from a common fluid source to drive the mechanisms to thereby control the valve performance of the individual valves, and which has an improved control response characteristic without increasing the driving resistance of the crankshaft or enlarging the fluid source.

To achieve the above objective, the present invention provides an apparatus for controlling valve performance of an internal combustion engine. The engine has a combustion chamber communicating with an air intake passage and an air exhaust passage. The intake passage has an air intake valve that is selectively opened and closed to control airflow passing in the intake passage to the combustion chamber. The exhaust passage has an air exhaust valve that is selectively opened and closed to control exhaust gas flow passing in the exhaust passage from the combustion chamber. Each of the valves is actuated by a camshaft based on valve performance affecting opening and closing timing and a lift amount of the valve. The apparatus includes a first changing means for changing the valve performance of the intake valve. The first changing means is actuated by fluid pressure. A second changing means changes the valve performance of the exhaust valve. The second changing means is actuated by the fluid pressure. A fluid source is connected with the first changing means and the second changing means to supply fluid to the first changing means and the second changing means. An adjusting means adjusts the amount of the fluid supplied from the fluid source to the first changing means and the second changing means. A detecting means detects the running condition of the engine. A control means controls the adjusting means to change each valve performance so as to coincide the engine torque with the desired engine torque. The control means includes selecting means for selecting one of the valves based on the detected running condition of the engine. The selected valve is capable of coinciding the engine torque with the desired torque faster than the other one of valves to allow a larger amount of the fluid supplied to one of the changing means that is associated with the selected valve than the other one of the changing means.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

First Embodiment

A first embodiment of a valve performance control apparatus according to the present invention and applied to a gasoline engine for a vehicle will now be described referring to FIGS. 1 through 10.

Figure 1:
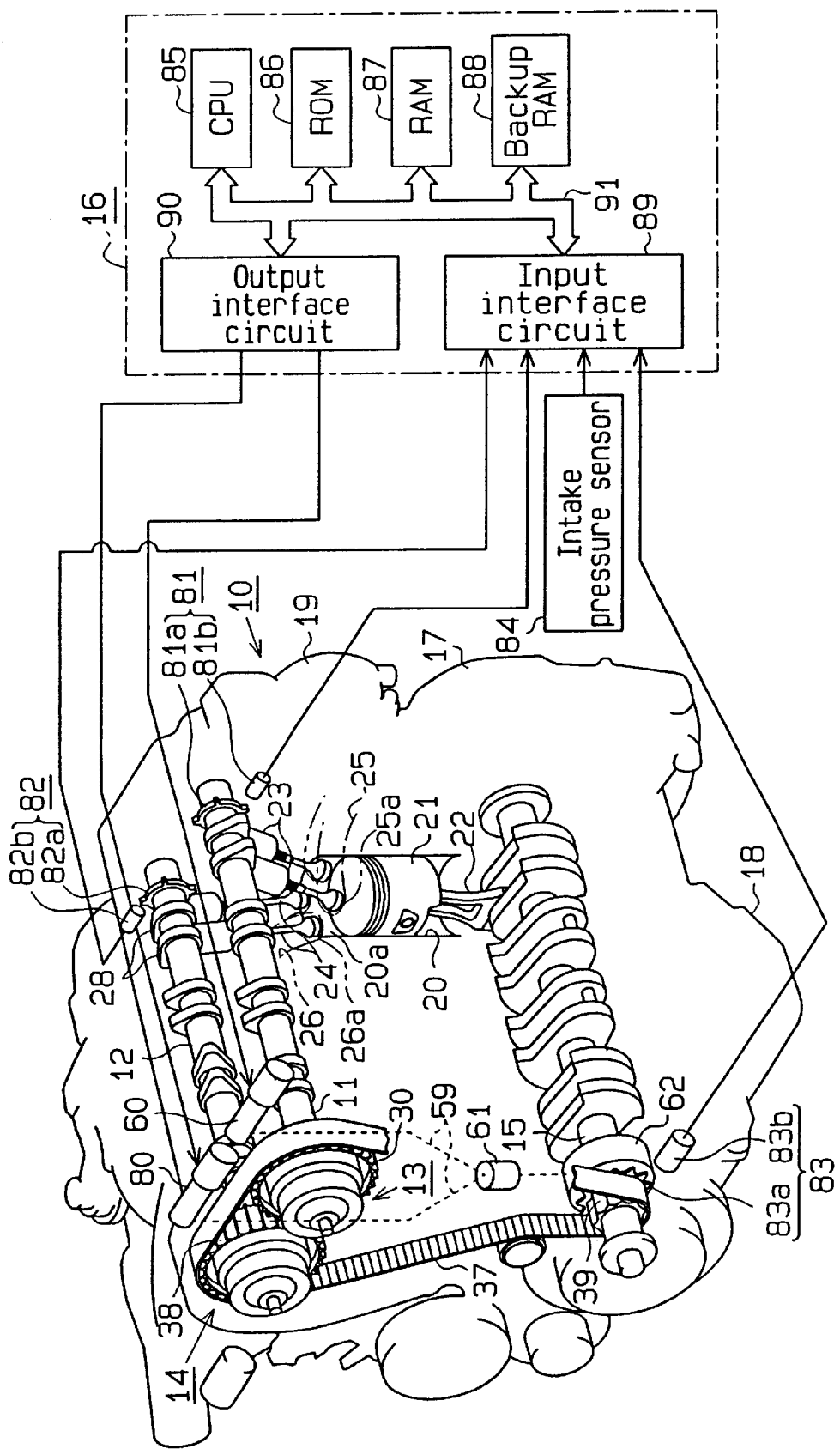
FIG. 1 is a schematic structural diagram illustrating a first embodiment of an engine system according to a first embodiment of the present invention.

FIG. 1 shows the schematic structure of a gasoline engine 10. As shown in FIG. 1, the engine 10 includes an intake camshaft 11, an exhaust camshaft 12, intake-side and exhaust-side variable valve timing mechanisms (hereinafter referred to as intake VVT and exhaust VVT) 13, 14, which are provided on the camshafts 11, 12, respectively, a crankshaft 15, and an electronic control unit (ECU) 16 for controlling the VVTs 13, 14.

The engine 10 has a cylinder block 17, an oil pan 18 fixed to the bottom of the cylinder block 17, and a cylinder head 19 fixed to the top of the block 17. The oil pan 18 retains lubrication oil which is supplied to the individual sections of the engine 10. The cylinder block 17 has a plurality of cylinders 20 each having a combustion chamber 20a. While there are a total of four cylinders 20 in this embodiment, only one of them is illustrated in FIG. 1.

The cylinder block 17 supports the crankshaft 15 in a rotational manner. A piston 21 located in each cylinder 20 is coupled via a connecting rod 22 to the crankshaft 15, which rotates as the pistons 21 move up and down.

The cylinder head 19 has a plurality of intake valves 23 and exhaust valves 24 in association with the individual cylinders 20, and the intake ports 25a and exhaust ports 26a communicate with the associated combustion chambers 20a. Each intake port 25a is connected to an intake passage 25 and each exhaust port 26a is connected to an exhaust passage 26. The intake valves 23 and the exhaust valves 24 selectively open and close the associated intake and exhaust ports 25a, 26a.

The cylinder head 19 rotatably supports the intake camshaft 11 and the exhaust camshaft 12, which is arranged parallel to the shaft 11. The intake camshaft 11 and exhaust camshaft 12 have a plurality of pairs of cams 27, 28, respectively, which are provided at predetermined intervals in the axial direction. As the camshafts 11, 12 rotate, the cams 27, 28 cause the intake valves 23 and the exhaust valves 24 to reciprocate.

The VVTs 13, 14 provided on the ends of the camshafts 11, 12, respectively, function to change the timing of opening and closing the associated valves 23, 24, that is, the valve timing.

Figure 2:
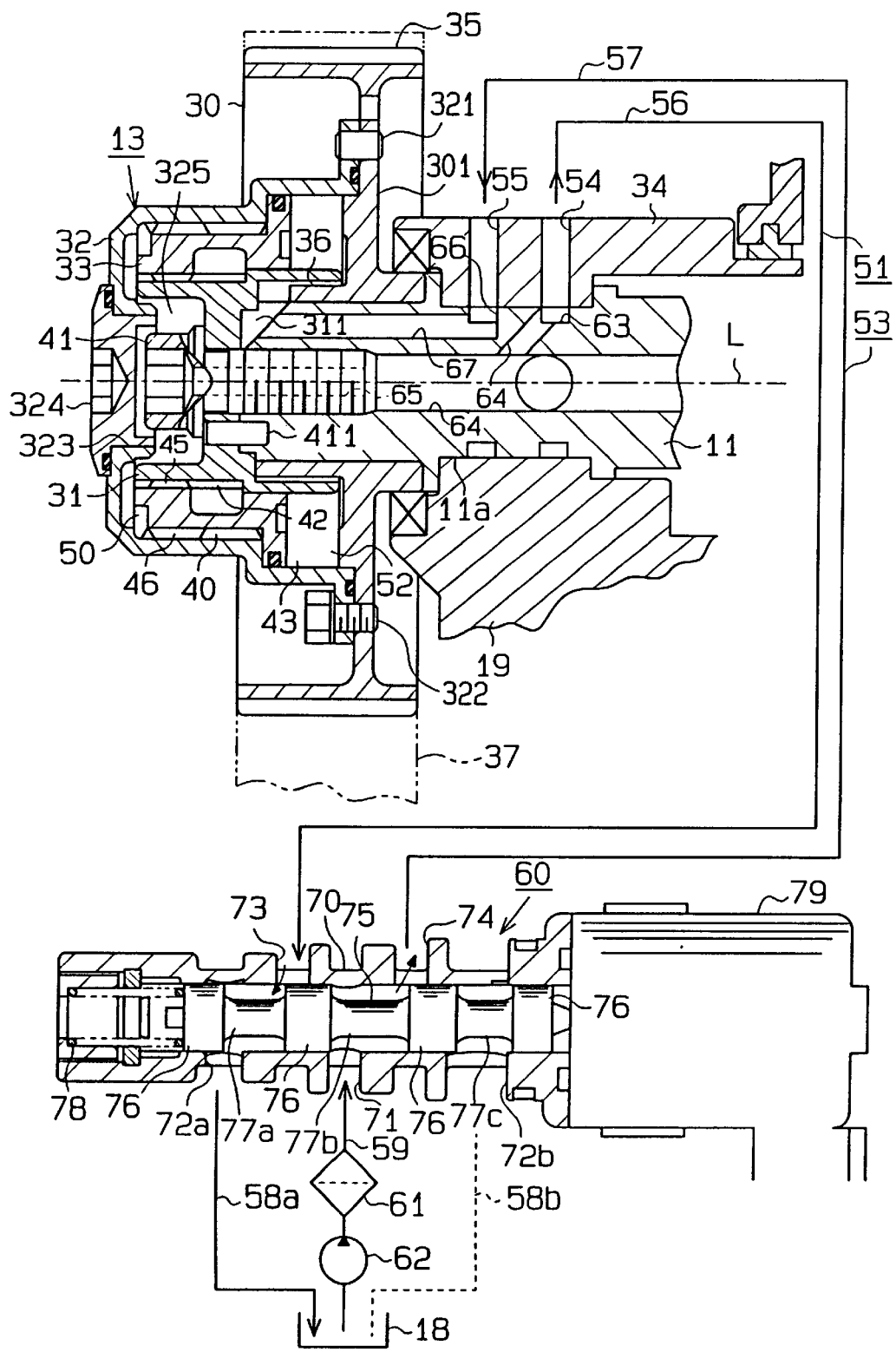
FIG. 2 is a cross-sectional view showing the intake-side VVT.

FIG. 2 shows the cross section of the intake camshaft 11 and the exhaust VVT 13. The structure of the exhaust camshaft 12 and the exhaust VVT 14 is the same as that of the intake camshaft 11 and the intake VVT 13. Thus, the exhaust camshaft 12 and the exhaust VVT will not be described below to avoid redundant description.

The intake VVT 13 has a pulley 30, an inner cap 31, a cover 32, and a ring gear 33. The cylinder head 19 and a bearing cap 34 rotatably support a journal 11a of the intake camshaft 11. The pulley 30 has a disk portion 301, a plurality of external teeth 35 formed on the outer periphery of the disk portion 301, and a boss 36 formed in the center of the disk portion 301. The pulley 30 is rotatably coupled to the boss 36 at the distal end portion (the left side as viewed in FIG. 2) of the intake camshaft 11.

A timing belt 37 is wound around the outer teeth 35 of the pulley 30 and connected to a pulley 38 of the exhaust VVT 14 and a crank pulley 39 of the crankshaft 15, as shown in FIG. 1. The torque of the crankshaft 15 is transmitted to the pulleys 38, 30 via the crank pulley 39 and the timing belt 37, and further transmitted to both camshafts 11, 12 via the pulleys 38, 30.

The cover 32 is cup shaped. The cover 32 covers the disk portion 301 of the pulley 30 and the distal end portion of the intake camshaft 11. A hole 323 is formed in the center of the cover 32. This hole 323 is closed by a cap 324. The cover 32 is fixed to the disk portion 301 by a plurality of pins 321 and bolts 322, so that the pulley 30 and the cover 32 rotate together.

A plurality of inner teeth 40 are formed on the inner periphery of the cover 32. The inner teeth 40 are helical teeth and are inclined by a predetermined angle with respect to the axis L of the intake camshaft 11.

The inner cap 31 is attached to the distal end of the intake camshaft 11 by a hollow bolt 41. The inner cap 31 is secured to the intake camshaft 11 by a pin 411, so that the inner cap 31 and the intake camshaft 11 rotate integrally.

Formed on the outer periphery of the inner cap 31 are a plurality of external helical teeth 42 which are similar to the inner teeth 40 of the cover 32.

The ring gear 33 is placed in an annular space 43 defined between the pulley 30, the cover 32, and the inner cap 31. Inner helical teeth 45 and external helical teeth 46, similar to the inner teeth 40, are formed on the inner periphery and the outer periphery of the ring gear 33. The inner teeth 45 engage with the external teeth 42 of the inner cap 31, and the external teeth 46 engage with the inner teeth 40 of the cover 32. The torque transmitted to the pulley 30 is therefore transmitted to the intake camshaft 11 via the ring gear 33 and the inner cap 31.

The ring gear 33 partitions the space 43 into two pressure chambers 50 and 52. The distal end portion (left side as viewed in FIG. 2) of the space 43 with respect to the ring gear 33 forms the first pressure chamber 50, while the proximal end portion (right side as viewed in FIG. 2) of the space 43 with respect to the ring gear 33 forms the second pressure chamber 52. The inner cap 31, the cover 32, the cap 324, and the hollow bolt 41 form a space 325, which communicates with the first pressure chamber 50.

A first pressure passage 51 and a second pressure passage 53 for supplying oil to the first pressure chamber 50 and the second pressure chamber 52 will now be described.

A pair of oil holes 54, 55 are formed in the bearing cap 34. The oil holes 54, 55 are connected to an intake-side oil control valve (hereinafter referred to as intake OCV) 60 by associated oil passages 56, 57.

An oil groove 63 is formed extending around the entire journal 11a of the camshaft 11. The oil groove 63 is connected to the oil hole 54. The oil hole 54 is located at the proximal end side (right side as viewed in FIG. 2) of the oil hole 55. An oil passage 64, which communicates with the oil groove 63, is defined in the intake camshaft 11. A center hole 65 extends through the bolt 41 axially. The center hole 65 connects the oil passage 64 to the space 325. The oil passage 56, the oil hole 54, the oil groove 63, the oil passage 64, the center hole 65, and the space 325 constitute the first pressure passage 51.

Another oil groove 66 is formed extending around the entire journal 11a of the camshaft 11 at a position closer to the distal end of the camshaft 11 than the oil groove 63. The oil groove 66 is connected to the oil hole 55. The oil hole 55 is located at the distal end side (left side as viewed in FIG. 2) of the oil hole 54. Another oil passage 67, which communicates with the oil groove 66, is formed in the intake camshaft 11. The oil passage 67 is connected to the second pressure chamber 52 via a space 311, which is defined between the inner cap 31, the distal end portion of the intake camshaft 11, and the boss 36 of the pulley 30. The oil passage 57, the oil hole 55, the oil groove 66, the oil passage 67, and the space 311 constitute the second pressure passage 53.

A structure for supplying oil to the first pressure passage 51 and the second pressure passage 53 will now be described.

As shown in FIG. 1, an oil pump 62 is connected to the crankshaft 15 so that it is driven by the rotation of the crankshaft 15. The oil pump 62 draws in oil that is retained in the oil pan 18 and forces the oil to the intake OCV 60 via a discharge passage 59. An oil filter 61 is disposed in the discharge passage 59 to sieve out foreign matter contained in the oil.

The intake OCV 60 serves to adjust the amount of oil (the level of the hydraulic pressure) supplied to the pressure chambers 50, 52 via the first and second pressure passages 51, 53. The intake OCV 60 has a substantially cylindrical casing 70 and a spool 75, which is reciprocally retained in the casing 70. The intake OCV 60 further includes an electromagnetic solenoid 79, which reciprocates the spool 75 and which is located at the rear side (right side as viewed in FIG. 2) of the casing 70, and a spring 78, which is located at the front side (left side as viewed in FIG. 2) of the casing 70 to normally urge the spool 75 rearward.

The casing 70 has a tank port 71, a pair of reservoir ports 72a, 72b, and a pair of discharge ports 73, 74. The tank port 71 is connected to the oil pump 62 via the discharge passage 59. The reservoir ports 72a, 72b are connected to the oil pan 18 via drain passages 58a, 58b, respectively. The discharge ports 73, 74 are supplied to the oil holes 54, 55, which are formed in the bearing cap 34, by way of the associated oil passages 56, 57.

The spool 75 has four lands 76 one of which blocks the flow of oil between each of the pairs of ports 71, 73; 71, 74; 73, 72a; and 74, 72b. The spool 75 has three passages 77a, 77b, and 77c extending between the adjacent lands 76. The passages 77a to 77c connect the ports 71, 73; 71, 74; 73, 72a; and 74, 72b to permit the flow of oil.

The spool 75 moves to a position where the forward urging force of the electromagnetic solenoid 79 is balanced with the rearward urging force of the spring 78. The urging force generated by the solenoid 79 is determined by the duty ratio of an exciting signal input to the solenoid 79. As the spool 75 moves to a predetermined position in accordance with the duty ratio, the connected state of the ports 71–74 is altered. The level of the hydraulic pressure communicated to the first and second pressure chambers 50, 52 is adjusted by altering the connected states of the individual ports 71–74 in this manner.

As shown in FIG. 1, the exhaust VVT 14 provided on the exhaust camshaft 12 is connected to the oil pump 62 by the discharge passage 59 via the oil filter 61 in the same manner as the intake VVT 13. An exhaust OCV 80, which communicates with the discharge passage 59, has the same structure as the intake OCV 60, and adjusts the amount of oil (the levels of the hydraulic pressure) supplied from the oil pump 62 to the first and second pressure chambers (not shown) of the exhaust VVT 14.

As shown in FIG. 1, the engine 10 is provided with sensors 81, 82, 83, 84 to detect the running condition of the engine 10.

Cam angle sensors 81, 82 are respectively provided with rotors 81a, 82a, which rotate integrally with the intake and exhaust camshafts 11, 12, and electromagnetic pickups 81b, 82b, which are opposed to the rotors 81a, 82a. The rotors 81a, 82a are disk-shaped magnetic bodies each having multiple teeth projecting from their outer peripheries. The electromagnetic pickups 81b, 82b output cam angle pulse signals SGIN2, SGEX2 each time the teeth of the rotors 81a, 82a pass by the pickups 81b, 82b as the camshafts 11, 12 rotate.

The crank angle sensor 83 has a rotor 83a, which rotates together with the crankshaft 15, and an electromagnetic pickup 83b facing the rotor 83a. The rotor 83a is formed of a disk-shaped magnetic body having multiple teeth formed at the outer periphery. The electromagnetic pickup 83b outputs a crank angle pulse signal SG1 every time a tooth of the rotor 83a passes by the pickup 83b as the crankshaft 15 rotates.

The intake pressure sensor 84 arranged in the intake passage 25 detects the pressure in the passage 25 by comparing the pressure to a vacuum state. The pressure in the intake passage is hereafter referred to as the manifold pressure PM.

The ECU 16 controls the OCVs 60 and 80 based on detection signals from the sensors 81–84. The ECU 16 includes a central processing unit (CPU) 85, a read only memory (ROM) 86, a random access memory (RAM) 87, a backup RAM 88, an input interface circuit 89, and an output interface circuit 90. A bus 91 connects the interface circuits 89 and 90 to each other.

Predetermined control programs and initial data are stored in the ROM 86. For example, a program for controlling the valve timing is stored in the ROM 86. The CPU 85 executes various processes in accordance with the control programs and initial data stored in the ROM 86. The RAM 87 temporarily stores the results of the processing performed by the CPU 85. The backup RAM 88 holds various data in the RAM 87 even after the supply of power to the ECU 16 is stopped.

The cam angle sensors 81, 82, the crank angle sensor 83, and the intake pressure sensor 84 are electrically connected to the input interface circuit 89. The OCVs 60, 80 are electrically connected to the output interface circuit 90. The ECU 16 computes the speed NE of the engine 10, displacement angles VT1, VT2 of the respective camshafts 11, 12 and other parameters based on the detection signals input to the input interface circuit 89 from the sensors 81–84. The ECU 16 controls the OCVs 60, 80 based on the computed values.

For instance, the ECU 16 measures the pulse interval of the crank angle signal SG1 output from the crank angle sensor 83 to compute the number of rotations of the crankshaft 15 per unit time, or the engine speed NE of the engine 10. Based on the cam angle signals SGIN2, SGEX2 and the crank angle signal SG1, the ECU 16 computes the relative rotational phases of the intake and exhaust camshafts 11, 12 with respect to the crankshaft 15, i.e., the displacement angles VT1, VT2. The displacement angles VT1, VT2 correspond to the altered rotational angle of the intake and exhaust camshafts 11, 12, which are altered by the VVTs 13, 14 in order to adjust the valve timing of the intake and exhaust valves 23, 24, respectively.

The ECU 16 controls the level of the hydraulic pressure supplied to the first pressure chamber 50 and the second pressure chamber 52 of the intake VVT 13 by changing the duty ratio DVT1 of the exciting signal, which is sent to the electromagnetic solenoid 79, within the range of 0% to 100%. The ECU 16 alters the valve timing of the intake valve 23 by controlling the hydraulic pressure in the pressure chambers 50, 52.

Figure 3:
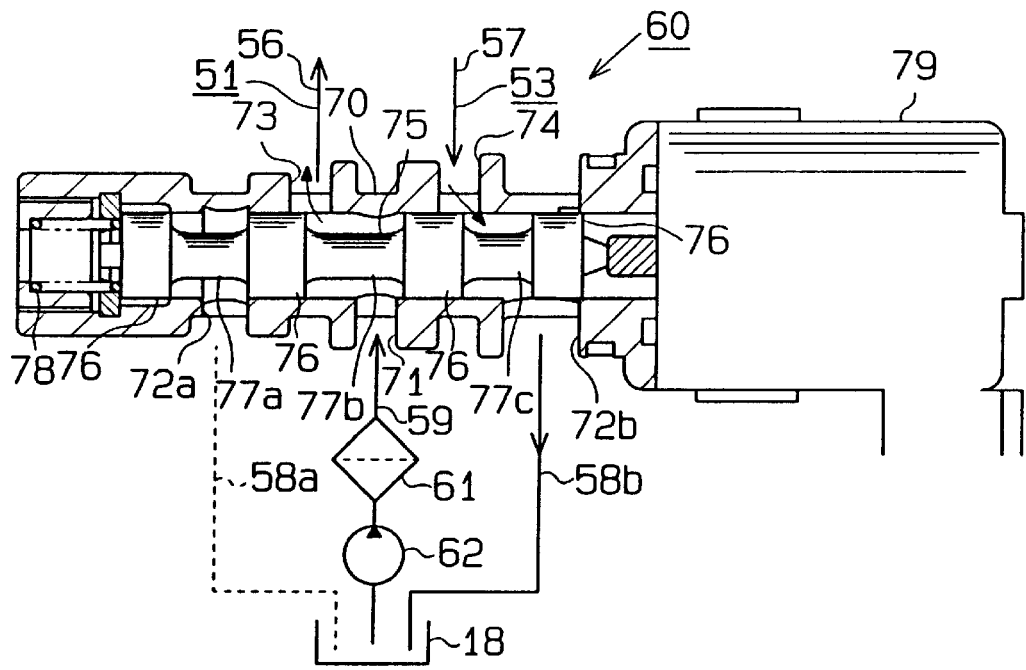
FIG. 3 is a cross-sectional view showing the intake-side oil control valve (OCV)

For example, the ECU 16 excites the electromagnetic solenoid 79 to move the spool 75 forward against the urging force of the spring 78 by holding the duty ratio DVT1 at a value greater than 50%. This moves the spool 75 to a timing advancing position, as shown in FIG. 3.

When the spool 75 reaches the advancing position, the tank port 71 and the discharge port 73 are connected by the passage 77b. This supplies the oil discharged from the oil pump 62 to the first pressure chamber 50 via the discharge passage 59 and the first pressure passage 51. Accordingly, the hydraulic pressure in the first pressure chamber 50 increases.

Furthermore, when the spool 75 reaches the advancing position, the discharge port 74 and the reservoir port 72b are connected by the passage 77c. This allows the oil in the second pressure chamber 52 to return to the oil pan 18 via the second pressure passage 53 and the drain passage 58b. This decreases the hydraulic pressure in the second pressure chamber 52.

Consequently, the hydraulic pressure applied to the ring gear 33 through the first pressure chamber 50 becomes greater than the hydraulic pressure applied to the gear 33 through the second pressure chamber 52. This moves the ring gear 33 toward the proximal end (right side as viewed in FIG. 2) of the intake camshaft 11 as the gear 33 rotates. As a result, torque is applied to the cap 31 thus rotating the inner cap 31 with respect to the pulley 30. The inner cap 31 and the intake camshaft 11 therefore rotate with respect to the pulley 30. The relative rotation changes the rotational phase of the intake camshaft 11 with respect to the pulley 30 and advances the valve timing of the intake valve 23.

When advancing the valve timing of the intake valve 23 in this manner, an increase in the duty ratio DVT1 results in a decrease in the portion of the discharge port 73 closed by the associated land 76. This increases the area of the opening of the port 73. As a result, the amount of oil supplied to the first pressure chamber 50 of the intake VVT 13 increases. This increases the speed of advancing the valve timing.

The ECU 16 moves the spool 75 rearward using the urging force of the spring 78 by exciting the electromagnetic solenoid 79 with the duty ratio DVT1 maintained at a value smaller than 50%. This causes the spool 75 to move to a timing delaying position, as shown in FIG. 2.

When the spool 75 reaches the delaying position, the tank port 71 and the discharge port 74 are connected by the passage 77b. Consequently, the oil discharged from the oil pump 62 is supplied to the second pressure chamber 52 via the discharge passage 59 and the second pressure passage 53. This increases the hydraulic pressure in the second pressure chamber 52.

Furthermore, when the spool 75 reaches the delaying position, the discharge port 73 and the reservoir port 72a are connected by the passage 77a. This allows the oil in the first pressure chamber 50 to return to the oil pan 18 via the first pressure passage 51 and the drain passage 58a. This decreases the hydraulic pressure in the first pressure chamber 50.

Consequently, the hydraulic pressure applied to the ring gear 33 through the second pressure chamber 52 becomes greater than the hydraulic pressure applied to the gear 33 through the first pressure chamber 50. This moves the ring gear 33 toward the distal end (the left side as viewed in FIG.

2) of the intake camshaft 11 as the gear 33 rotates. As a result, torque is applied to the inner cap 31 thus rotating the cap 31 with respect to the pulley 30. The inner cap 31 and the intake camshaft 11 therefore rotate with respect to the pulley 30. The relative rotation changes the rotational phase of the intake camshaft 11 with respect to the pulley 30 and delays the valve timing of the intake valve 23.

When delaying the valve timing of the intake valve 23 in this manner, a decrease in the duty ratio DVT1 results in a decrease in the portion of the discharge port 74 that is closed by the associated land 76. This increases the area of the opening of the port 74. As a result, the amount of oil supplied to the second pressure chamber 52 of the intake VVT 13 increases. This increases the speed of delaying the valve timing.

Figure 4:
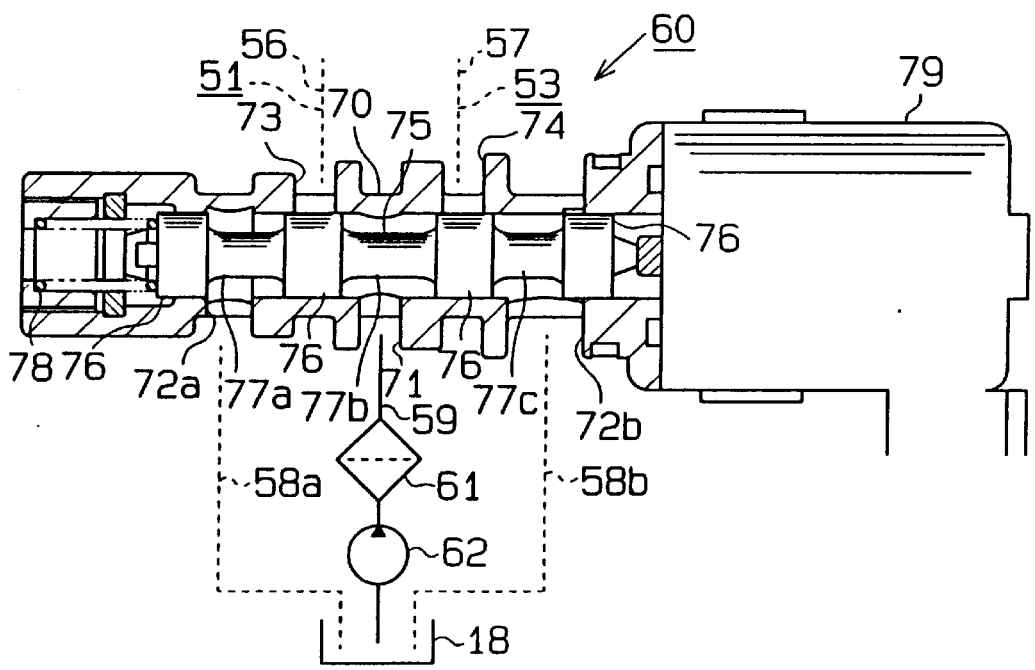
FIG. 4 is a cross-sectional view showing the exhaust-side OCV.

The ECU 16 moves the spool 75 to a middle position between the advancing position and the delaying position by exciting the electromagnetic solenoid 79 with the duty ratio DVT1 maintained at 50%. (This ratio will hereafter be referred to as sustaining duty ratio DVTH.) As a result, the spool 75 moves to a sustaining position, as shown in FIG. 4.

When the spool 75 reaches the sustaining position, the discharge ports 73, 74 are closed by the associated lands 76. Therefore, oil is neither supplied to nor discharged from the pressure chambers 50, 52. The ring gear 33 is thus held by the hydraulic pressures of the pressure chambers 50, 52. This maintains the current valve timing of the intake valve 23.

As described above, the intake VVT 13 is capable of continuously varying the valve timing of the intake valve 23 with the desirable speed and is also capable of maintaining a desirable timing.

In the same manner, the exhaust VVT 14 is capable of continuously varying the valve timing of the exhaust valve 24 with the desirable speed and also capable of maintaining the desirable timing by changing the duty ratio DVT2 of the electromagnetic solenoid (not shown) employed in the exhaust OCV 80.

Figure 5:
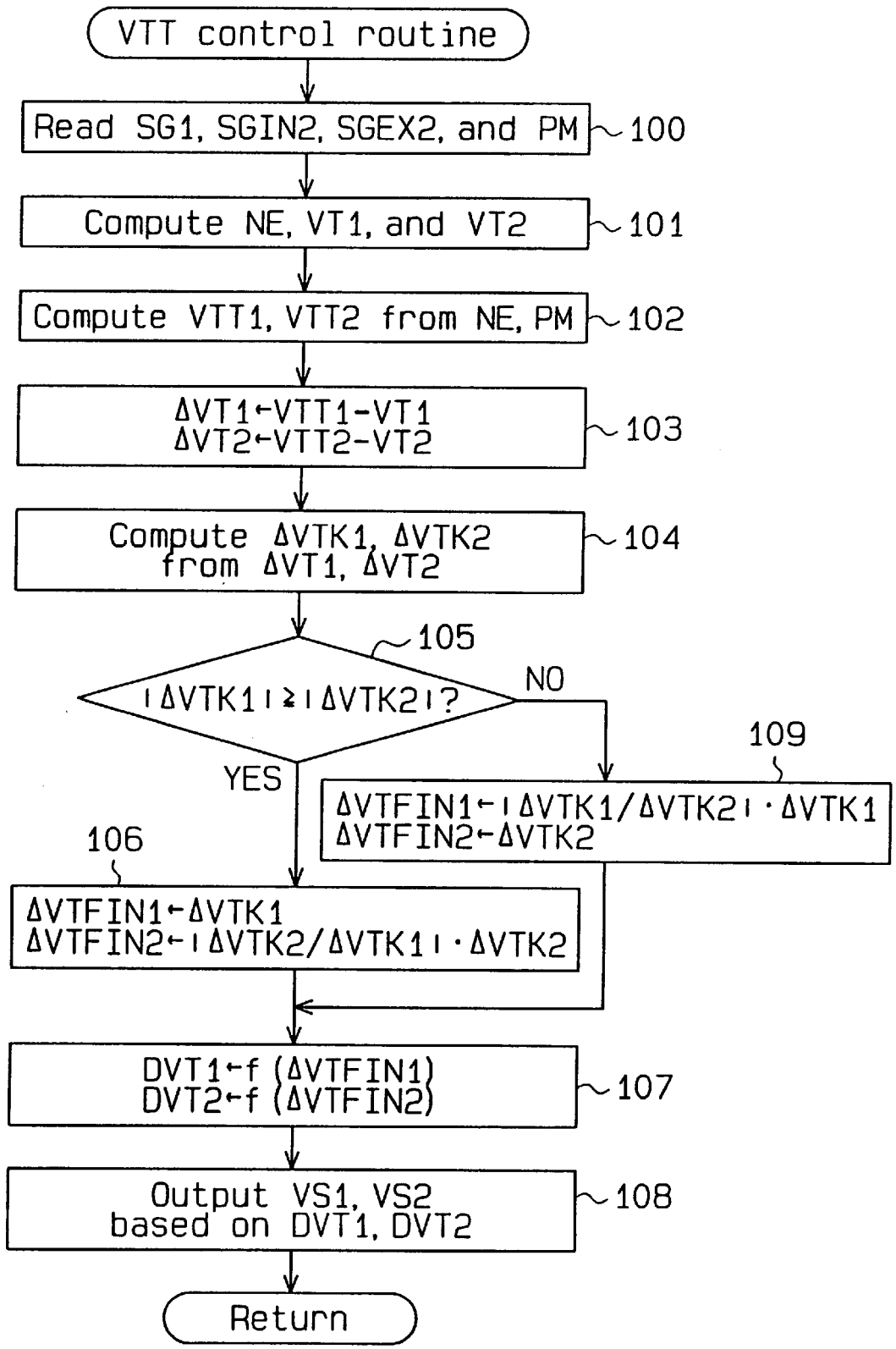
FIG. 5 is a flowchart illustrating individual processes in the VVT control routine of the first embodiment.

Control procedures for controlling the valve timing according to this embodiment will now be discussed with reference to the flowchart in FIG. 5. FIG. 5 illustrates the individual processes in a valve timing control routine (hereafter referred to as the VVT control routine). The ECU 16 executes the routine in a cyclic manner with a predetermined time interval between each cycle.

In step 100, the ECU 16 reads the crank angle signal SG1, the cam angle signals SGIN2, SGEX2, and the manifold pressure PM that are detected by the crank angle sensor 83, the cam angle sensors 81, 82, and the intake pressure sensor 84, respectively.

In step 101, the ECU 16 computes the engine speed NE based on the crank angle signal SG1, and computes the displacement angles VT1, VT2 of the associated camshafts 11, 12 based on the signal SG1 and the cam angle signals SGIN2, SGEX2.

In step 102, the ECU 16 computes target displacement angles VTT1, VTT2 of the associated camshafts 11, 12 in accordance with the engine speed NE and the manifold pressure PM. The ECU 16 also refers to function data stored in the ROM 86. In this embodiment, the function data is set so as to maximize the output torque of the engine 10 when the displacement angles VT1, VT2 become equal to the target displacement angles VTT1, VTT2, respectively, in correspondence with the running condition of the engine 10.

In step 103, the ECU 16 subtracts the displacement angles VT1, VT2 from the target displacement angles VTT1, VTT2, respectively, to compute the deviation $\Delta$VT1 between the displacement angles VTT1, VT1 and the deviation $\Delta$VT2 between the displacement angles VTT2, VT2.

In step 104, the ECU 16 computes compensation deviations $\Delta$VTK1, $\Delta$VTK2 that correspond to the deviations $\Delta$VT1, $\Delta$VT2, respectively. The ECU 16 also refers to function data stored in the ROM 86. This function data differs from the aforementioned function data.

Figure 6:
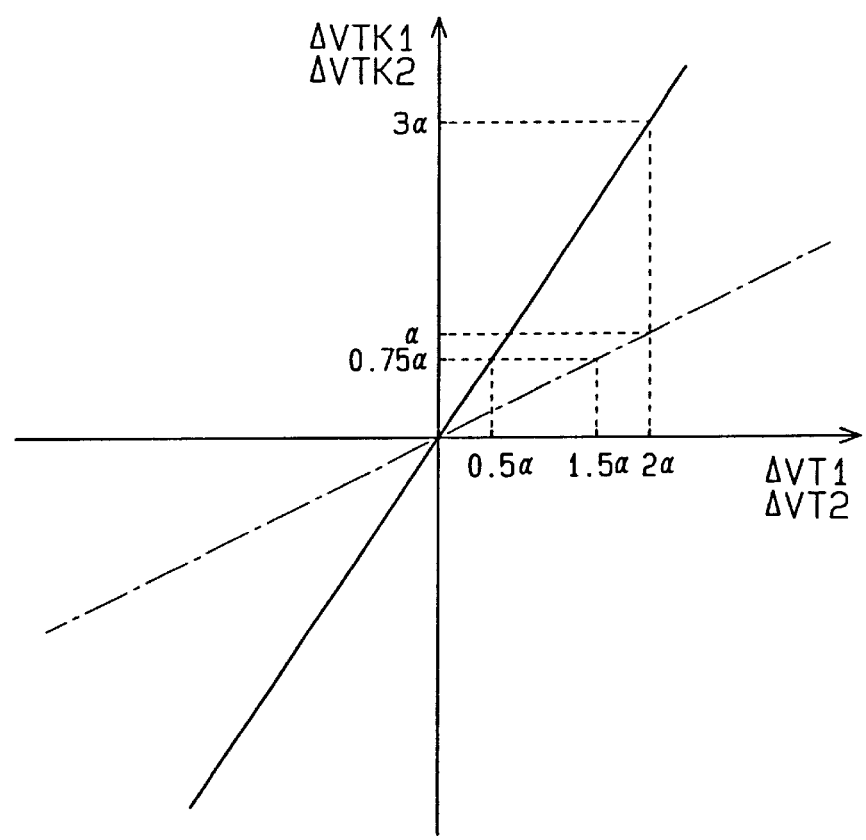
FIG. 6 is a graph showing the relation between the deviation and the compensation deviation.

FIG. 6 shows a graph representing the function data. The solid line indicates the relation between the deviation $\Delta$VT1 and the compensation deviation $\Delta$VTK1 for the intake camshaft 11, and the single dotted line indicates the relation between the deviation $\Delta$VT2 and the compensation deviation $\Delta$VTK2 for the exhaust camshaft 12.

It is apparent from the graph that as the deviations $\Delta$VT1, $\Delta$VT2 increases, the compensation deviations $\Delta$VTK1, $\Delta$VTK2 increase. The increase rate of the compensation deviation $\Delta$VTK1 with respect to the deviation $\Delta$VT1, or the inclination of the solid line, is greater than the increase rate of the compensation deviation $\Delta$VTK2 with respect to the deviation $\Delta$VT2, or the inclination of single-dotted line. Accordingly, the compensation deviation $\Delta$VTK1 corresponding to the deviation $\Delta$VT1 is set larger than the compensation deviation $\Delta$VTK2 corresponding to the deviation $\Delta$VT2 even if the deviations $\Delta$VT1, $\Delta$VT2 are equal to each other. In this embodiment, as apparent from the above, the deviations $\Delta$VT1, $\Delta$VT2 are set so that the compensation deviation $\Delta$VTK1 of the intake camshaft 11 becomes larger while the compensation deviation $\Delta$VTK2 of the exhaust camshaft 12 becomes smaller when carrying out step 104.

The valve timings of the intake valve 23 and the exhaust valve 24 influence the characteristics of the engine 10. It is generally known that the valve timing of the intake valve 23 greatly contributes to the enhancement of the output torque of the engine 10 and to the improvement of the fuel consumption. The valve timing of the exhaust valve 24 significantly contributes to suppressing undesirable engine emissions.

With regard to the function data shown in FIG. 6, the inclinations of the solid line and the single dotted-line are determined based on the contribution ratio of the valve timings with respect to a change in the output torque of the engine 10, that is, the change in the output torque, when the individual valve timings are varied by a predetermined level. Since the valve timing of the intake valve 23 contributes to increasing the output torque more than the valve timing of the exhaust valve 24, the inclination of the solid line is set greater than the inclination of the single dotted line in FIG. 6.

In step 105, the ECU 16 determines whether the absolute value |$\Delta$VTK1| of the compensation deviation $\Delta$VTK1 is equal to or greater than the absolute value |$\Delta$VTK2| of the compensation deviation $\Delta$VTK2. When the condition in step 105 is satisfied (|$\Delta$VTK1|$\geq$|$\Delta$VTK2|), the ECU 16 proceeds to step 106.

In step 106, the ECU 16 sets the final deviation $\Delta$VTFIN1 to a value equal to the compensation deviation $\Delta$VTK1 and computes the final deviation $\Delta$VTFIN2 from the following equation (1).

$$\Delta\text{VTFIN2} = |\Delta\text{VTK2}/\Delta\text{VTK1}|\Delta\text{VTK2} \quad (1)$$

Since the value |$\Delta$VTK2/$\Delta$VTK1| in the equation (1) is equal to or smaller than "1", the value of the computed final deviation $\Delta$VTFIN2 is equal to or smaller than the compensation deviation ΔVTK2. The small value of the computed final deviation ΔVTFIN2 restricts the amount of oil supplied to the exhaust VVT 14.

When the condition in step 105 is not satisfied (|ΔVTK1|<|ΔVTK2|), the ECU 16 proceeds to step 109.

In step 109, the ECU 16 sets the final deviation ΔVTFIN2 as a value equal to the compensation deviation ΔVTK2 and computes the final deviation ΔVTFIN1 from the following equation (2).

$$\Delta VTFIN1 = |\Delta VTK1/\Delta VTK2|\Delta VTK1 \qquad (2)$$

Since the value |ΔVTK1/ΔVTK2| in the equation (2) is smaller than "1", the final deviation ΔVTFIN1 is smaller than the compensation deviation ΔVTK1. The small value of the computed final deviation ΔVTFIN1 restricts the amount of oil supplied to the intake VVT 13.

After computing the final deviations ΔVTFIN1, ΔVTFIN2 in either one of the steps 106, 109, the ECU 16 proceeds to step 107.

Figure 7:
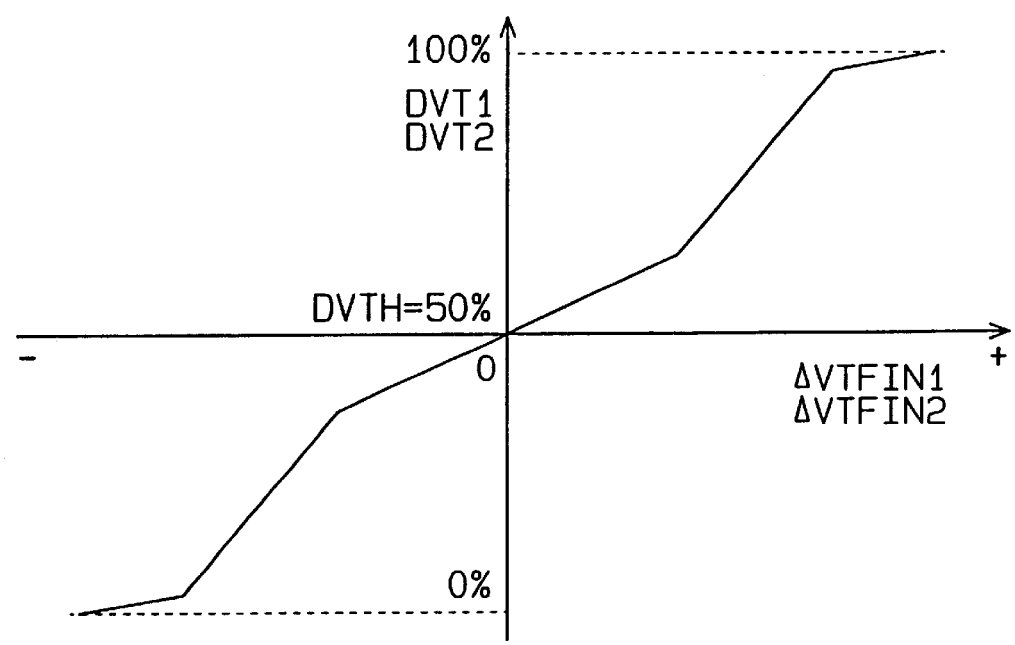
FIG. 7 is a graph showing the relation between the final deviation and the duty ratio.

In step 107, the ECU 16 computes the duty ratios DVT1, DVT2 corresponding to the final deviations ΔVTFIN1, ΔVTFIN2. The ECU 16 also refers to function data stored in the ROM 86. FIG. 7 shows a graph representing the function data. As apparent from this graph, the duty ratios DVT1, DVT2 increase as the final deviations ΔVTFIN1, ΔVTFIN2 increase.

In step 108, the ECU 16 sends exciting signals VS1, VS2 corresponding to the duty ratios DVT1, DVT2 to the OCVs 60, 80, respectively. As a result, the VVTs 13, 14 are actuated to advance or delay the valve timings of the valves 23 and 24 or to sustain the current valve timings. After executing step 108, the ECU 16 temporarily terminates the routine.

The operation of this embodiment when advancing the valve timing will now be described. It is assumed that the displacement angles VT1, VT2 are increased to the target displacement angles VTT1, VTT2 (VTT1=VTT2=4α) from the same predetermined value of 2α (α>0).

Figure 8:
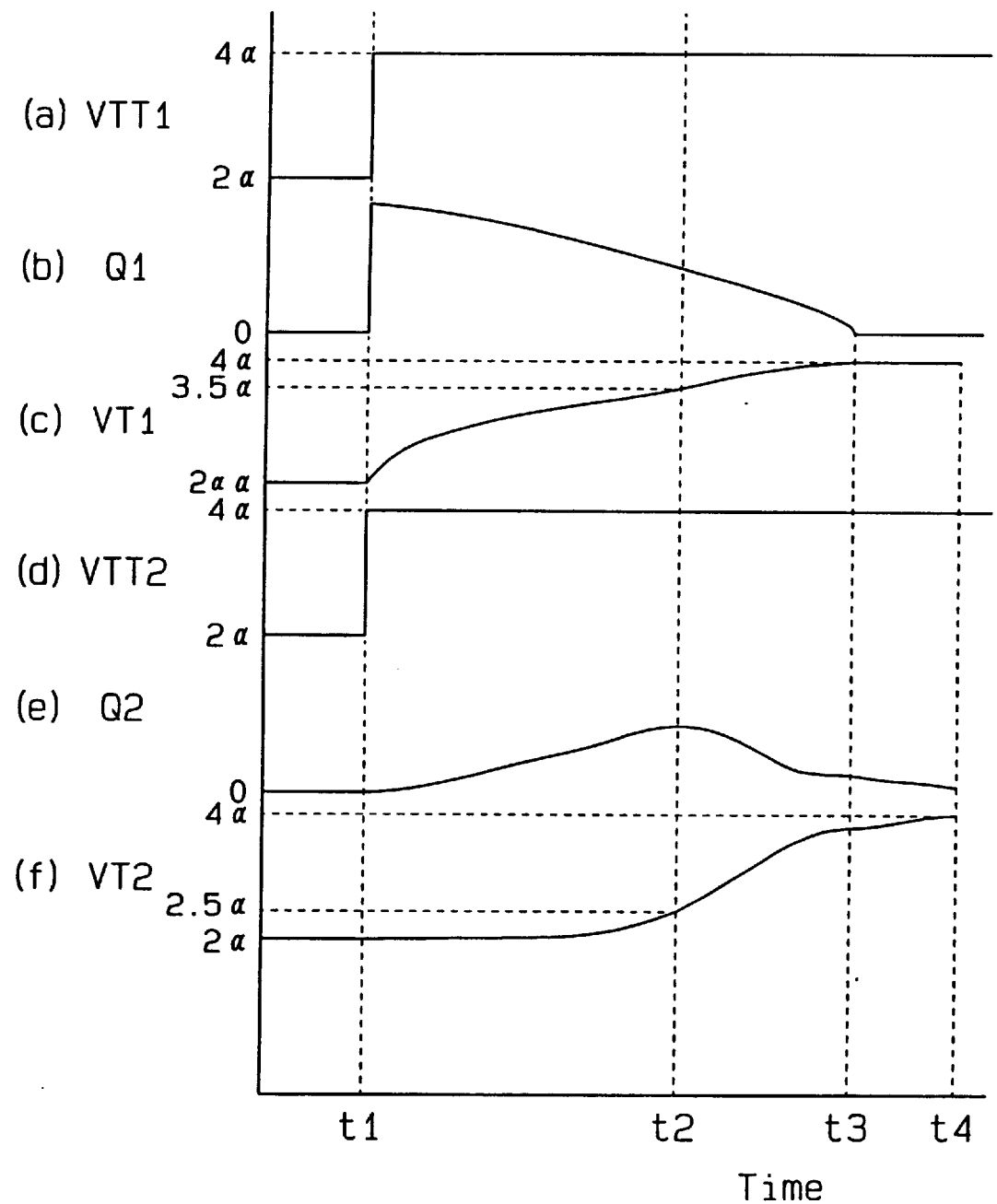
FIG. 8 is a timing chart showing the time-dependent behaviors of parameters such as the amount of oil supplied to each VVT and the displacement angle.

FIG. 8 is a timing chart showing time-dependent changes in the target displacement angles VTT1, VTT2, the displacement angles VT1, VT2, the oil amount Q1 supplied to the intake VVT 13, and the oil amount Q2 supplied to the exhaust VVT 14. The ECU 16 executes the individual processes in the VVT control routine every predetermined control cycle after starting the engine 10. Timings t1, t2, t3, t4 in the diagram show representative control timings.

Figure 10:
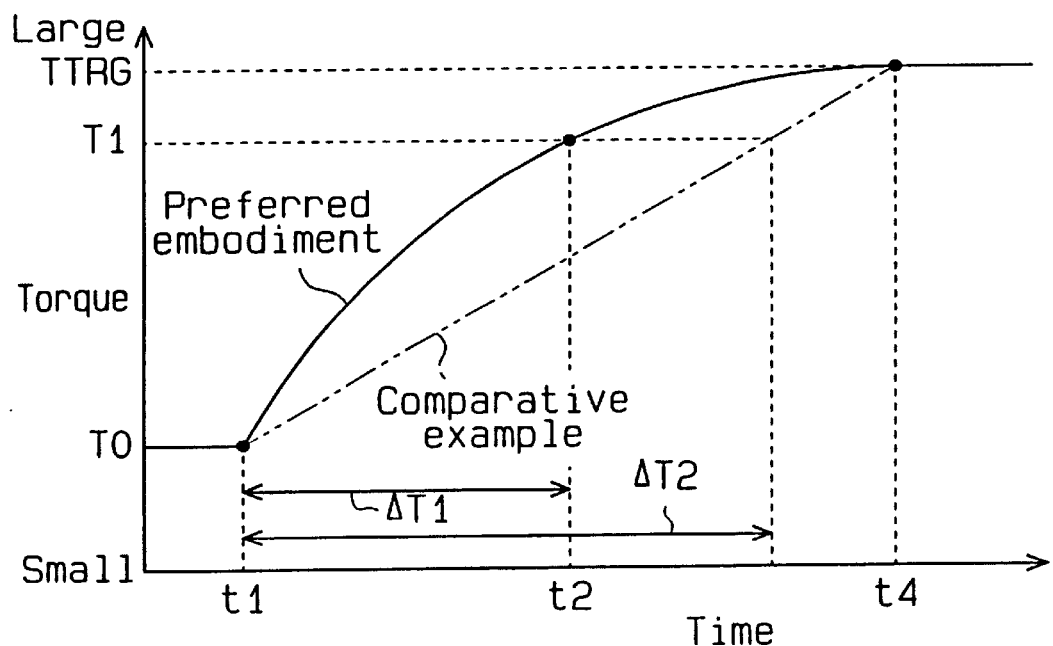
FIG. 10 is a graph showing a time-dependent change in the output torque.

As shown in FIG. 10, when the target displacement angles VTT1, VTT2 are set at 4α at the timing t1, the ECU 16 computes the deviations ΔVT1, ΔVT2 as a predetermined value 2α (=4α−2α).

The ECU 16 then computes the compensation deviations ΔVTK1, ΔVTK2 corresponding to the deviations ΔVT1, ΔVT2, respectively. In this case, the ECU 16 computes the compensation deviation ΔVTK1 corresponding to the deviation ΔVT1 (=2α) as 3α. The ECU 16 also computes the compensation deviation ΔVTK2 corresponding to the deviation ΔVT2 (=2α) as α, as shown in FIG. 6.

Since the absolute value |ΔVTK1| of the compensation deviation ΔVTK1 is equal to or greater than the absolute value |ΔVTK2| of the compensation deviation ΔVTK2 (i.e., |ΔVTK1=3α≧|ΔVTK2|=α), the ECU 16 sets the final deviation ΔVTFIN1 to a value of 3α, which is equal to the compensation deviation ΔVTK1. The ECU 16 also sets the final deviation ΔVTFIN2 to α/3 in accordance with the equation (1). Afterwards, the ECU 16 computes the duty ratios DVT1, DVT2 according to the final deviations ΔVTFIN1 (=3α), ΔVTFIN2 (=α/3), and sends the exciting signals VS1, VS2 corresponding to the duty ratios DVT1, DVT2 to the OCVs 60, 80, respectively.

In this embodiment, the final deviation ΔVTFIN1 is set greater than the final deviation ΔVTFIN2 (ΔVTFIN1=3α and ΔVTFIN2=α/3) even when the deviations ΔVT1, ΔVT2 are equal to each other (ΔVT1=ΔVT2=2α). The duty ratio DVT1 of the exciting signal VS1 output to the intake OCV 60 therefore becomes greater than the duty ratio DVT2 of the exciting signal VS2 output to the exhaust OCV 80. As shown in FIGS. 8(b) and 8(e), the oil amount Q1 supplied to the intake VVT 13 becomes greater than the oil amount Q2 supplied to the exhaust VVT 14 at the timing t1.

Consequently, as shown in FIGS. 8(c) and 8(f), the displacement angle VT1 increases at an altering rate that is greater than that of the displacement angle VT2 so that the alteration of the valve timing of the intake valve 23 is given priority over the alteration of the valve timing of the exhaust valve 24. Between timings t1 and t2, the oil amount Q1 supplied to the intake VVT 13 is greater than the oil amount Q2 supplied to the exhaust VVT 14. This advances the valve timing of the intake valve 23.

Between timings t1 and t2, an increase in the displacement angles VT1, VT2 decreases the difference between the compensation deviations ΔVTK1, ΔVTK2. This enables the compensation deviations ΔVTK1, ΔVTK2 to eventually coincide with each other. More specifically, when the displacement angles VT1, VT2 respectively become 3.5α and 2.5α (VT1=3.5α and VT2=2.5α) at the timing t2, the ECU 16 computes the deviations ΔVT1, ΔVT2 as 0.5α, 1.5α (ΔVT1=0.5α, ΔVT2=1.5α), respectively. The ECU 16 then computes the compensation deviations ΔVTK1, ΔVTK2 corresponding to the deviations ΔVT1, ΔVT2 as 0.75α.

Consequently, the ECU 16 sends the exciting signals VS1, VS2 corresponding with the duty ratios DVT1, DVT2 to the OCVs 60, 80, respectively. This equalizes the oil amounts Q1, Q2 supplied to the VVTs 13, 14, respectively, and advances the valve timings at an equal altering rate.

In the period starting from the timing t2, the compensation deviations ΔVTK1, ΔVTK2 become equal to each other and the same amount of oil is supplied to the VVTs 13, 14. As the deviations ΔVT1, ΔVT2 decrease, the duty ratios DVT1, DVT2 decrease, as shown in FIG. 7. This gradually decreases the oil amounts Q1, Q2 supplied to the VVTs 13, 14.

At the timing t3, the displacement angle VT1 of the intake camshaft 11 reaches the target displacement angle VTT1 (4α) and the deviation ΔVT1 and the compensation deviation ΔVTK1 both become "0". Therefore, the ECU 16 sets the final deviation ΔVTFIN1 as "0". Since the value of the duty ratio DVT1 is set as the value of the sustaining duty ratio DVTH, the oil amount Q1 supplied to the intake VVT 13 becomes "0".

During the period between the timings t3 and t4, oil is supplied only to the exhaust VVT 14. Thus, only the valve timing of the exhaust valve 24 is varied. At the timing t4, the displacement angle VT2 of the exhaust camshaft 12 reaches the target displacement angle VTT2 (=4α). As a result, the duty ratios DVT1, DVT2 are set to the sustaining duty ratio DVTH after the timing t4. This maintains the current valve timings.

Figure 9:
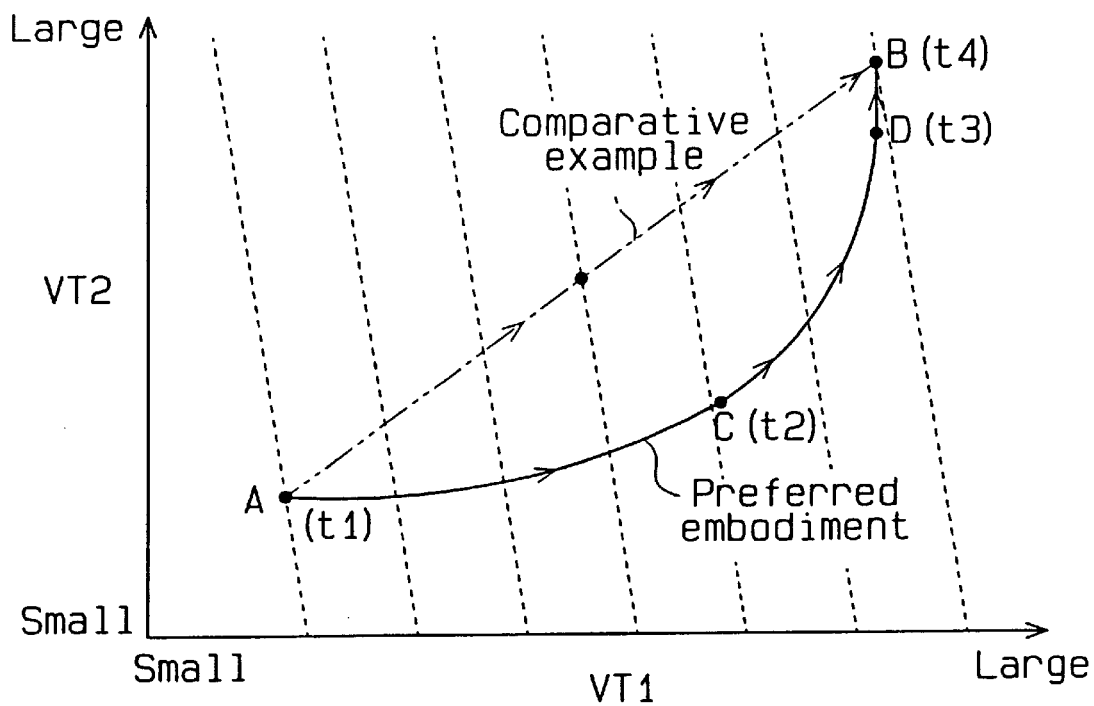
FIG. 9 is an explanatory diagram for explaining the operation of the first embodiment.

The solid line in FIG. 9 is a characteristic curve indicating the relationship between the displacement angles VT1, VT2 in the above-described example. Points A, C, D and B on this curve correspond to the states of the displacement angles VT1, VT2 at the timings t1 to t4. The displacement angles VT1, VT2 vary along the characteristic curve proceeding in the order of points A, C, D, B.

The dotted lines in FIG. 9 indicate equal torque lines. When displacement angles VT1, VT2 change along the equal torque lines, the change in the output torque of the engine 10 is small. When the displacement angles VT1, VT2 change in a manner exceeding the equal torque line, the output torque of the engine 10 changes greatly.

The double-dotted line in FIG. 9 is a characteristic curve indicating the relationship between the displacement angles VT1, VT2 in a comparative example. The comparative example differs from the preferred embodiment in that the deviations ΔVT1, ΔVT2 are processed equally.

As apparent from the solid line in FIG. 9, priority is given to altering the displacement angle VT1 of the intake camshaft 11 between points A and C (between the timings t1 and t2). Therefore, the characteristic curve (the solid line) in this embodiment is inclined from the characteristic curve (the double-dotted line) of the comparative example, in which the altering rates of the displacement angles VT1, VT2 are equal to each other. Furthermore, between points A and C, the characteristic curve of the preferred embodiment extends substantially perpendicularly with respect to the equal torque lines.

FIG. 10 shows a graph indicating time-dependent changes in the output torque of the preferred embodiment and the comparative example. The solid line shows time-dependent changes in the output torque of the preferred embodiment while the double-dotted line shows time-dependent changes in the output torque of the comparative example.

As apparent from the FIG. 10, the output torques of both the preferred embodiment and the comparative example increase from the initial torque TO at timing t1 to the target torque TTRG at timing t4.

In the comparative example, the output torque increases in a linear manner as time elapses. In comparison, the output torque increases at a greater altering rate between timings t1 to t2 in the preferred embodiment. This is because the characteristic curve (the solid line) showing the relation between the displacement angles VT1, VT2 traverses the equal torque lines substantially perpendicularly, as shown in FIG. 9, when the characteristic curve changes from the state indicated by point A to the state indicated by point C (between the timings t1 and t2).

In the preferred embodiment, the output torque reaches the target torque TTRG earlier than in the comparative example. For example, the output torque requires time Δt2 from the timing t1 to reach a predetermined value T1 in the comparative example. In comparison, the output torque requires a shorter time Δt1 to reach the predetermined value T1.

The foregoing describes the case where the deviations ΔVT1 and ΔVT2 become equal to each other. A description will now be given of the case in which the deviation ΔVT2 of the exhaust camshaft 12 is greater than the deviation ΔVT1 of the intake camshaft 11 at the timing t1 while the condition in step 105 is not satisfied (e.g., when ΔVT1=0.5α and ΔVT2=2α). In this case, since the final deviation ΔVTFIN1 of the intake camshaft 11 is computed from the equation (2) as a smaller value, the alteration of the valve timing of the exhaust valve 24 is given priority over the alteration of the valve timing of the intake valve 23.

The reason for giving priority to the alteration of the valve timing of the exhaust valve 24 when the condition in step 105 is not fulfilled will now be described. As mentioned above, the valve timing of the intake valve 23 contributes more to improving the output torque of the engine 10 than the valve timing of the exhaust valve 24. When the absolute value |ΔVTFIN1| of the final deviation ΔVTFIN1 is small, the duty ratio DVT1 is computed as a small value, as shown in FIG. 7, so that the speed of changing the valve timing of the intake valve 23 becomes slower. In this case, if priority is given to the alteration of the valve timing of the intake valve 23, the rate of increase of the output torque is decreased.

In this embodiment, the absolute values |ΔVTFIN1|, |ΔVTFIN2| of the final deviations ΔVTFIN1, ΔVTFIN2 are compared with each other to determine whether the altering speed of the valve timing of the intake valve 23 is slow enough. If it is determined that this speed is slow enough, priority is given to the alteration of the valve timing of the exhaust valve 24 over the alteration of the valve timing of the intake valve 23. This prevents the rate of increase of the output torque from becoming slower.

Although the foregoing description has been given of the case where the displacement angles VT1, VT2 are both increased (the valve timings are advanced), the valve timing of one of the valves 23, 24, which increases the rate of increase in the output torque of the engine 10, is given priority even when the displacement angles VT1, VT2 are both decreased (the valve timings are delayed) or in the case where one of the displacement angles VT1, VT2 increases while the other displacement angle decreases.

As apparent from above, in this embodiment, the absolute values |ΔVTK1|, |ΔVTK2| of the compensation deviations ΔVTK1, ΔVTK2 are compared with each other to accurately select the valve timing of either the valve 23 or the valve 24, whichever contributes more to increasing the output torque. Accordingly, the amount of oil supplied to the other (unselected) VVT 13, 14 used to vary the valve timing is restricted.

This permits a sufficient amount of oil to be supplied from the oil pump 62 to the VVT 13 or VVT 14 that varies the selected valve timing. This enables the valve timing to be altered at a faster speed. It is thus possible to increase the output torque of the engine 10 to the target torque at an earlier time. This improves the responsiveness of the valve timing control.

Furthermore, the preferred embodiment does not require the enlargement of the oil pump 62 unlike a structure designed to increase the discharge performance of the oil pump 62 in order to acquire the same responsiveness. A substantial decrease in the output torque of the engine 10, which would be caused by driving an oil pump 62 with a larger discharge performance, is also avoided in this embodiment.

Additionally, the preferred embodiment improves the output torque of the engine 10 merely by changing the control of the OCVs 60, 80. Unlike a structure which requires a separate oil pump to actuate the VVTs 13, 14, the preferred embodiment therefore avoids an increase in the cost of the control apparatus.

Second Embodiment

A second embodiment according to the present invention will now be described with reference to FIGS. 11, 12 and 14. In this embodiment, several processes in the VVT control routine differ from the first embodiment. The camshafts 11, 12, the VVTs 13, 14, and the OCVs 60, 80 have the same structures as those of the first embodiment.

Figure 11:
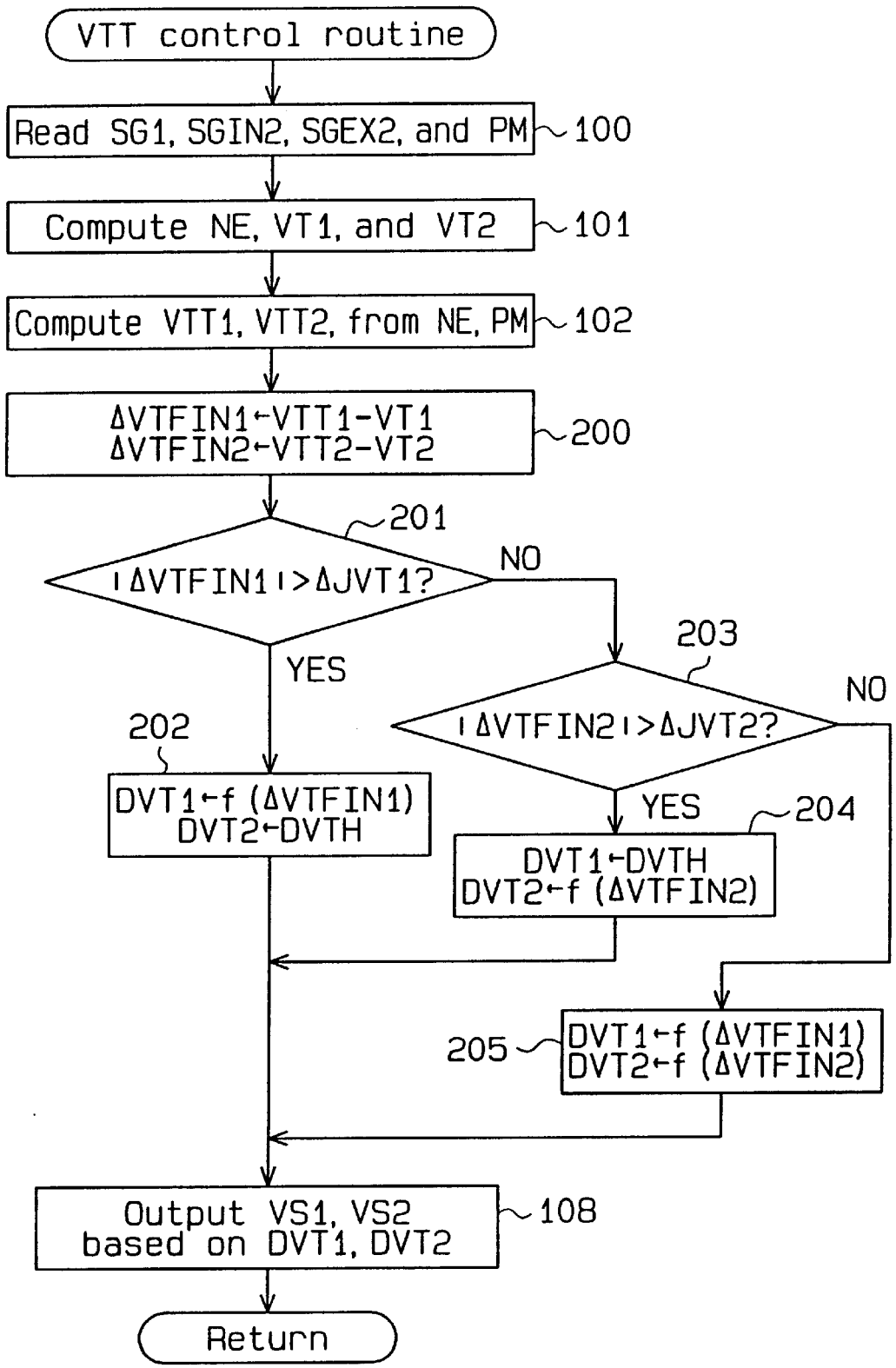
FIG. 11 is a flowchart illustrating individual processes in the VVT control routine of a second embodiment according to the present invention.

FIG. 11 shows a flowchart illustrating the VVT control routine. To avoid redundant description, same numerals are given to those steps that are the same as the corresponding steps in the VVT control routine of the first embodiment, which is shown in FIG. 5.

In this routine, the ECU 16 proceeds to step 200 after executing the steps 100 to 102.

In step 200, the ECU 16 subtracts the displacement angles VT1, VT2 from the target displacement angles VTT1, VTT2 to compute the final deviations ΔVTFIN1, ΔVTFIN2, respectively.

In step 201, the ECU 16 determines whether the absolute value |ΔVTFIN1| of the final deviation ΔVTFIN1 of the intake camshaft 11 is greater than a first determination value ΔJVT1. If this condition is fulfilled (|ΔVTFIN1|>ΔJVT1), the ECU 16 proceeds to step 202.

In step 202, the ECU 16 computes the duty ratio DVT1 in accordance with the final deviation ΔVTFIN1 and sets the value of the duty ratio DVT2 as the value of the sustaining duty ratio DVTH (50%). When computing the duty ratio DVT1, the ECU 16 refers to the function data shown in FIG. 7.

When the condition in step 201 is not fulfilled (|ΔVTFIN1|≦ΔJVT1), the ECU 16 proceeds to step 203.

In step 203, the ECU 16 determines whether the absolute value |ΔVTFIN2| of the final deviation ΔVTFIN2 is greater than a second determination value ΔJVT2. If this condition is satisfied (|ΔVTFIN2|>ΔJVT2), the ECU 16 proceeds to step 204.

In step 204, the ECU 16 sets the value of the duty ratio DVT1 as the value of the sustaining duty ratio DVTH (50%) and computes the duty ratio DVT2 in accordance with the final deviation ΔVTFIN2. When computing the duty ratio DVT2, the ECU 16 refers to the function data shown in FIG. 7.

If the condition in step 203 is not fulfilled (|ΔVTFIN2|≦ΔJVT2), the ECU 16 proceeds to step 205.

In step 205, the ECU 16 computes the duty ratios DVT1, DVT2 in accordance with the final deviations ΔVTFIN1, ΔVTFIN2. During the computation, the ECU 16 refers to the function data shown in FIG. 7.

After executing steps 202, 204, and 205, the ECU 16 proceeds to step 108 and then temporarily terminates the routine after execution of step 108.

In this routine, the first determination value ΔJVT1 is a value for determining whether or not priority should be given to the alteration of the valve timing of the intake valve 23 when varying the valve timings of the intake valve 23 and the exhaust valve 24.

On the other hand, the second determination value ΔJVT2 is a value for determining whether or not priority should be given to the alteration of the valve timing of the exhaust valve 24 when changing the valve timings. The ECU 16 compares the determination values ΔJVT1, ΔJVT2 with the absolute values |ΔVTFIN1|, |ΔVTFIN2| of the final deviations ΔVTFIN1, ΔVTFIN2, respectively, to determine which valve timing should be given priority when changing the valve timings.

Figure 12:
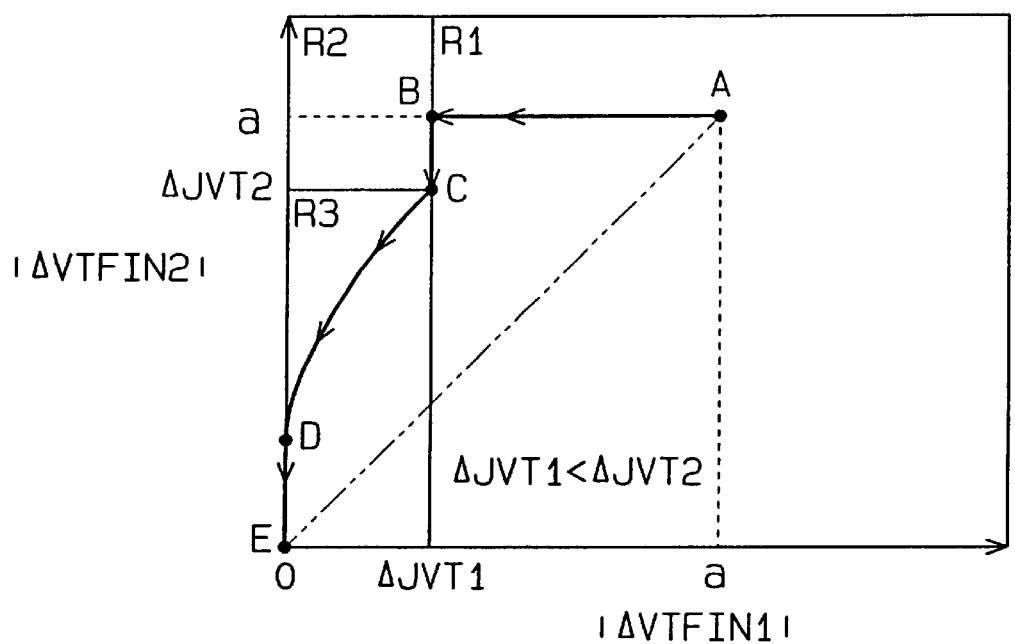
FIG. 12 is an explanatory diagram for explaining the operation of the second embodiment.

FIG. 12 shows a graph for explaining which valve timing should be given priority when changing the valve timings of the intake valve 23 and the exhaust valve 24.

In FIG. 12, priority is given to the valve timing of the intake valve 23 when the absolute value |ΔVTFIN1| of the final deviation ΔVTFIN1 is included in range R1, which includes values greater than the first determination value ΔJVT1. Priority is not given to the valve timing of the exhaust valve 24 in range R1.

Priority is given to the valve timing of the exhaust valve 24 when the absolute value |ΔVTFIN2| of the final deviation ΔVTFIN2 is included in range R2, which includes values greater than the second determination value ΔJVT2. Priority is not given to the valve timing of the intake valve 23 in range R2.

The valve timings are altered based on the duty ratios DVT1, DVT2, which are computed in accordance with the final deviations ΔVTFIN1, ΔVTFIN2, respectively, in range R3, which excludes ranges R1, R2.

In this embodiment, the first determination value ΔJVT1 is set smaller than the second determination value ΔJVT2 (JVT1<JVT2). Accordingly, range R1, in which priority is given to the valve timing of the intake valve 23, is set over a wider range than the other ranges R2, R3, as shown in FIG. 12.

When the absolute values |ΔVTFIN1|, |ΔVTFIN2| of the final deviations ΔVTFIN1, ΔVTFIN2 are equal to each other at point A in FIG. 12 (|ΔVTFIN1|=|VTFIN2|=a), only the valve timing of the intake valve 23 is altered.

As mentioned above, the valve timing of the intake valve 23 contributes more to improving the output torque of the engine 10 than the valve timing of the exhaust valve 24. Thus, in this embodiment, the output torque of the engine 10 is enhanced by setting the first determination value JVT1 smaller than the second determination value JVT2 by giving priority to the alteration of the valve timing of the intake valve 23 over the alteration of the valve timing of the exhaust valve 24.

The operation of this embodiment will now be described when the displacement angles VT1, VT2 of both camshafts 11, 12 sustained at the same predetermined value α are increased to the target displacement angles VTT1, VTT2, which are equal to each other (VTT1=VTT2=β). In this case, the absolute values |VTFIN1|, |ΔVTFIN2| of the final deviations ΔVTFIN1, ΔVTFIN2 vary in the order of the states indicated by points A, B, C, D, and E.

Figure 14:
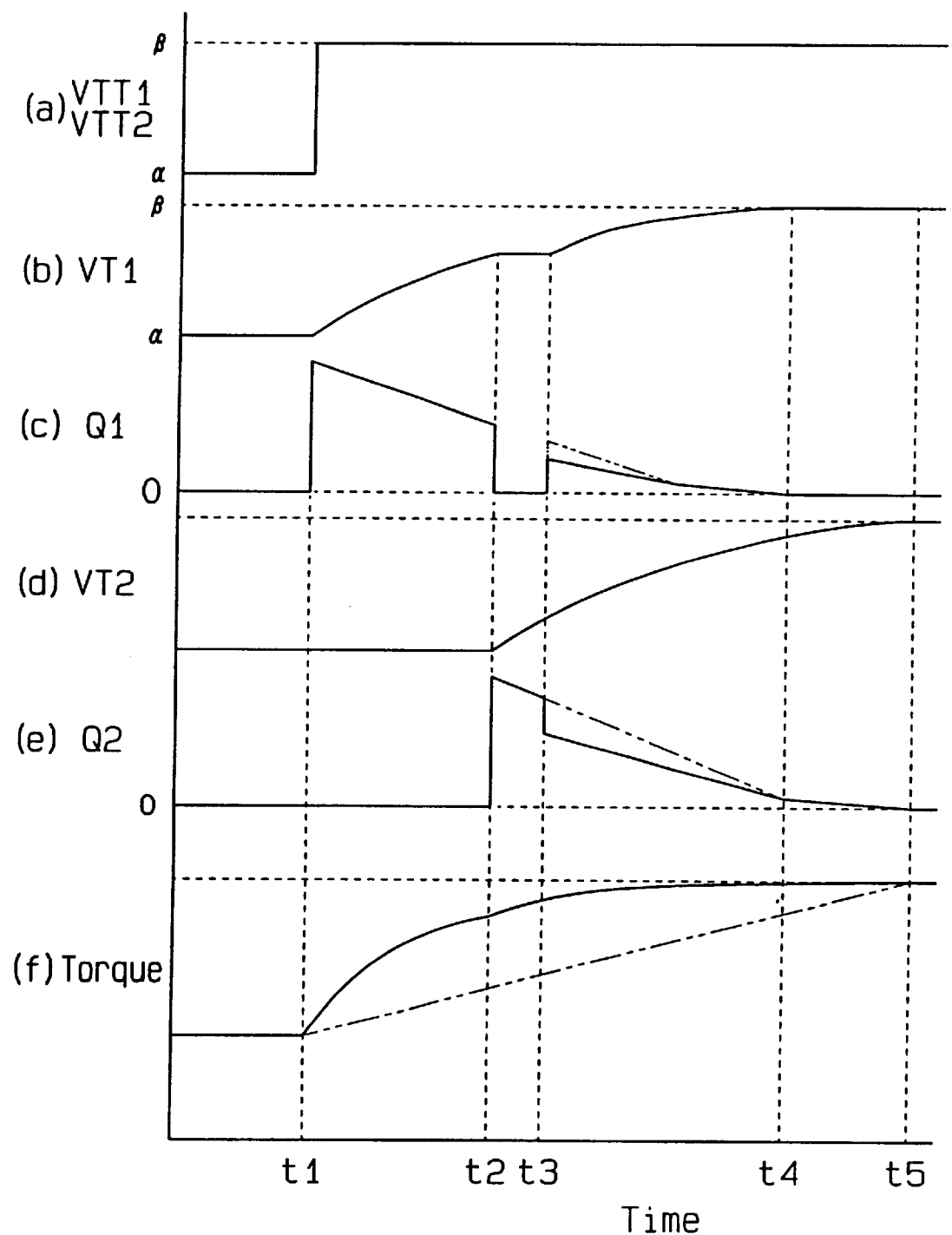
FIG. 14 is a timing chart showing the time-dependent behaviors of parameters such as the amount of oil to be supplied to each VVT and the displacement angle of the second embodiment.
Figure 15:
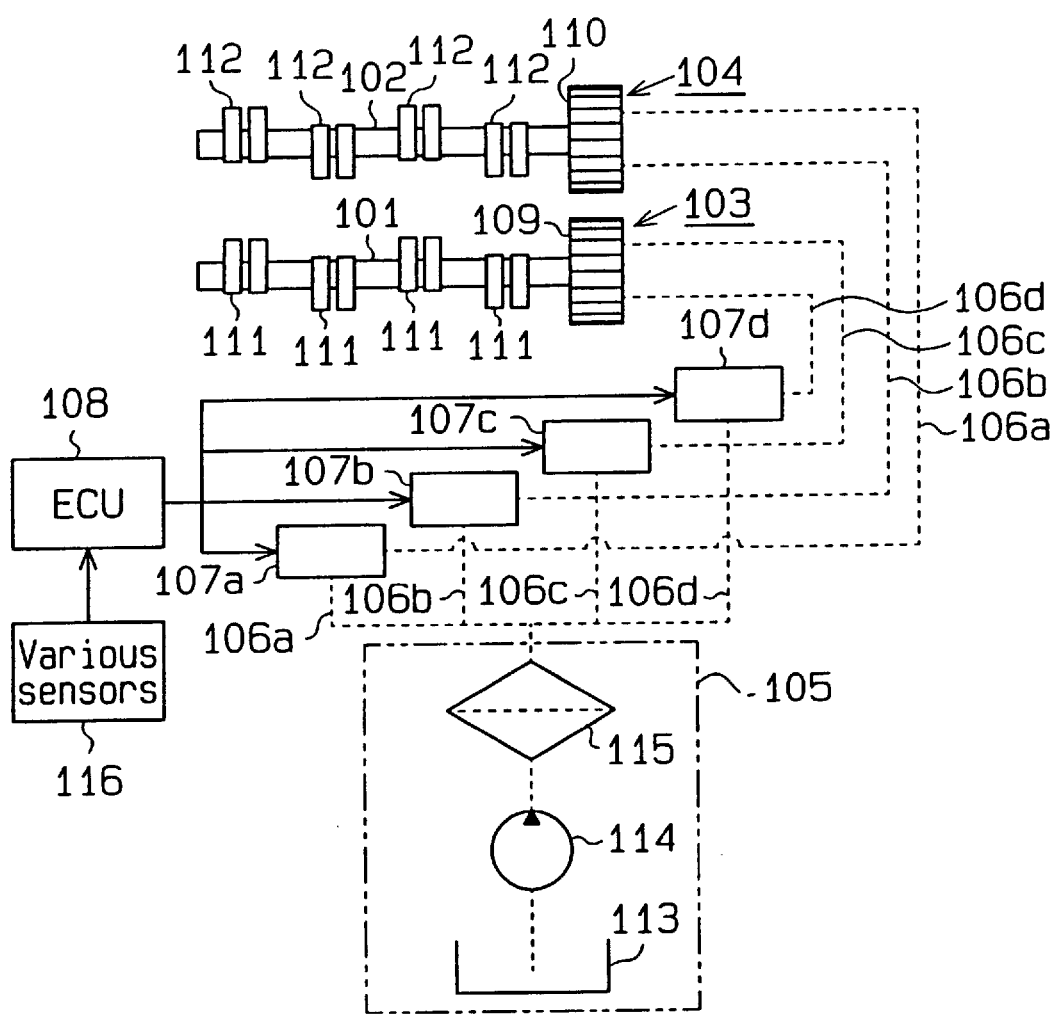
FIG. 15 is a schematic system structural diagram of an intake/exhaust control apparatus for an internal combustion engine in the prior art.

FIG. 14 is a timing chart showing time-dependent changes of the target displacement angles VTT1, VTT2, the displacement angles VT1, VT2, the oil amount Q1 supplied to the intake VVT 13, and the oil amount Q2 supplied to the exhaust VVT 14.

As shown in the FIG. 14, the target displacement angles VTT1, VTT2 are changed to the predetermined value β at timing t1. At this time (at the state shown by the point A in FIG. 12), the absolute value |ΔVTFIN1| of the final deviation ΔVTFIN1 is greater than the determination value ΔJVT1. Thus, the ECU 16 computes the duty ratio DVT1 according to the final deviation ΔVTFIN1 and sets the duty ratio DVT2 to the sustaining duty ratio DVTH.

The ECU 16 then controls the OCVs 60, 80 based on the exciting signals VS1, VS2 corresponding to the duty ratios DVT1, DVT2, respectively. Thus, although oil is not supplied to the exhaust VVT 14, oil amount Q1 is supplied to the intake VVT 13, as shown in FIGS. 14(c) and 14(e). As a result, only the displacement angle VT1 of the intake camshaft 11 is increased to advance the valve timing of the intake valve 23 as shown in FIGS. 14(b) and 14(d). Between the timings t1 and t2, only the valve timing of the intake valve 23 is changed.

At timing t2, the absolute values |ΔVTFIN1|, |ΔVTFIN2| of the final deviations ΔVTFIN1, ΔVTFIN2 come to the states indicated by the point B in FIG. 12. Thus, the absolute value |ΔVTFIN1| of the final deviation ΔVTFIN1 becomes equal to the first determination value ΔJVT1. Consequently, the ECU 16 sets the value of the duty ratio DVT1 as the value of the sustaining duty ratio DVTH and computes the duty ratio DVT2 according to the final deviation ΔVTFIN2.

The ECU 16 then controls the OCVs 60, 80 based on the exciting signals VS1, VS2, which correspond to the duty ratios DVT1, DVT2. Accordingly, the oil amount Q1 supplied to the intake VVT 13 is decreased to "0" while the oil amount Q2 supplied to the exhaust VVT 14 is increased, as shown in FIGS. 14(c) and (e). As a result, the displacement angle VT2 of the exhaust camshaft 12 is increased to advance only the valve timing of the exhaust valve 24 as apparent from FIGS. 14(b) and (d). That is, only the valve timing of the exhaust valve 24 is changed between the timings t2 and t3.

Between the timings t1 and t2, only the valve timing of the intake valve 23 is changed so that the absolute value $|\Delta\text{VTFIN1}|$ of the final deviation $\Delta\text{VTFIN1}$ is decreased to be equal to the determination value $\Delta\text{JVT1}$, as shown in FIG. 12. As the absolute value $|\Delta\text{VTFIN1}|$ decreases, the duty ratio DVT1 is set to a smaller value, as shown in FIG. 7. This reduces the oil amount Q1 supplied to the intake VVT 13. Consequently, the rate of altering the valve timing of the intake valve 23 becomes slower. This reduces the rate of increasing the output torque.

Therefore, in this embodiment, the VVT to which oil is supplied from the oil pump 62 is switched to the exhaust VVT 14 from the intake VVT 13 to give priority to the alteration of the valve timing of the exhaust valve 24. This permits the output torque to be increased more than that in the case where priority is given to the alteration of the valve timing of the intake valve 23.

As shown in FIG. 12, between the timings t2 and t3, the absolute values $|\Delta\text{VTFIN1}|$ and $|\Delta\text{VTFIN2}|$ of the final deviations $\Delta\text{VTFIN1}$ and $\Delta\text{VTFIN2}$ proceed from point C to point B. As a result, the ECU 16 computes the duty ratios DVT1, DVT2 according to the respective final deviations $\Delta\text{VTFIN1}$, $\Delta\text{VTFIN2}$ at timing t3.

The ECU 16 then controls the OCVs 60, 80 based on the exciting signals VS1, VS2, which correspond to the duty ratios DVT1, DVT2, respectively. Accordingly, the predetermined oil amounts Q1, Q2 are supplied to the VVTs 13, 14, respectively, as apparent from FIGS. 14(c) and 14(e). As a result, both displacement angles VT1, VT2 are increased to advance the valve timings of the valves 23, 24, as shown in FIGS. 14(b) and 14(d). That is, between the timings t3 and t4, the valve timings of both valves 23 and 24 are changed.

The changes in the oil amounts Q1 and Q2 indicated by the double-dotted line in FIGS. 14(c) and 14(e) show changes in the oil amounts Q1 and Q2 when oil is supplied to only one of the VVTs 13, 14. As apparent from FIGS. 14(c) and 14(e), the oil amounts Q1, Q2 supplied to the VVTs 13, 14 (both indicated by the solid lines) are smaller than the oil amounts indicated by the double-dotted lines in this embodiment. The reason for this phenomenon will now be described.

In this embodiment, oil is supplied to the VVTs 13, 14 from the common oil pump 62. Thus, in the period starting at timing t3, the oil pumped out from the pump 62 is distributed to the VVTs 13, 14. As a result, the oil amounts Q1, Q2 supplied to the VVTs 13, 14 are reduced.

At timing t4, the final deviations $\Delta\text{VTFIN1}$ and $\Delta\text{VTFIN2}$ come to the states at the point D in FIG. 12 so that the final deviation $\Delta\text{VTFIN1}$ becomes "0". That is, the displacement angle VT1 of the intake camshaft 11 reaches the target displacement angle VTT1 ($=\beta$) as indicated in FIG. 14(c). The ECU 16 therefore sets the value of the duty ratio DVT1 as the value of the sustaining duty ratio DVTH. Consequently, the oil amount Q1 supplied to the intake VVT 13 becomes "0", as shown in FIG. 14(b). Thus, during the period between timings t4 and t5, the valve timing of the intake valve 23 is sustained at the current timing while only the valve timing of the exhaust valve 24 is advanced.

As shown in FIG. 12, at timing t5, the final deviations $\Delta\text{VTFIN1}$, $\Delta\text{VTFIN2}$ proceeds to point E so that both final deviations $\Delta\text{VTFIN1}$, $\Delta\text{VTFIN2}$ become "0". That is, the displacement angles VT1, VT2 of the camshafts 11, 12, respectively, reach the associated target displacement angles VTT1, VTT2 ($=\beta$), as shown in FIGS. 14 (b) and 14(d). Consequently, the oil amounts Q1, Q2 of oil supplied to the VVTs 13, 14 become "0". Therefore, the valve timings of the valves 23 and 24 are sustained at the current timings.

The double-dotted line in FIG. 14(f) indicates changes in the absolute values $|\Delta\text{VTFIN1}|$, $|\Delta\text{VTFIN2}|$ of the final deviations $\Delta\text{VTFIN1}$, $\Delta\text{VTFIN2}$, respectively, in the comparative example that is compared to this embodiment. In the comparative example, the absolute values $|\Delta\text{VTFIN1}|$, $|\Delta\text{VTFIN2}|$ are linearly changed to the state indicated by point E from the state indicated by point A in FIG. 12.

More specifically, the oil discharged from the oil pump 62 is equally distributed to the VVTs 13, 14 in the comparative example. The amount of oil supplied to the VVTs 13, 14 become relatively smaller than in the case which oil is supplied to only one of the VVTs 13, 14. This slows the valve timing altering speed in comparison to when only one valve timing is altered.

However, in this embodiment, oil is supplied only to either one of the intake VVT 13 or the exhaust VVT 14 between the timings t1 and t3. Thus, sufficient amount of oil is supplied to both VVTs 13, 14. This embodiment enables the valve timings to be altered at sufficiently fast rates, and thus increases the output torque of the engine 10 more than in the comparative example.

Accordingly, as apparent from FIG. 14(f), this embodiment allows the output torque of the engine 10 to reach the target output torque TTRG more quickly than the comparative example (change in the output torque is indicated by the double-dotted line). It is thus possible to improve the responsiveness of the valve timing control.

Further, according to this embodiment, the absolute values $|\Delta\text{VTFIN1}|$, $|\Delta\text{VTFIN2}|$ of the final deviations $\Delta\text{VTFIN1}$, $\Delta\text{VTFIN2}$ are respectively compared with determination values $\Delta\text{JVT1}$, $\Delta\text{JVT2}$ to accurately select the valve timing of either the valve 23 or the valve 24, whichever contributes more to increasing the output torque more significantly. Oil is then supplied to only one of the VVTs 13, 14 so that the priority is given only to the selected valve timing. It is thus possible to supply a sufficient amount of oil to one of the VVTs 13, 14 from the oil pump 62. This allows the selected valve timing to quickly increase the output torque of the engine 10.

Although only two embodiments of the present invention have been described herein, it should be apparent to those skilled in the art that the present invention may be embodied in many other specific forms without departing from the spirit or scope of the invention. Particularly, it should be understood that the invention may be embodied in the following forms.

In the above-described embodiments, when controlling the individual valve timings, priority is given to the valve timing that increases the output torque of the engine 10 more. Instead of this structure, among the two valve timings, the valve timing that contributes more to suppressing the deterioration of emission may be selected and given priority for alteration. Likewise, the valve timing that contributes more to improving various characteristics of the engine 10, such as the fuel consumption and the idling stability, may be selected and given priority.

In the above-described embodiments, the valve timings of opening and closing both valves 23, 24 are changed. Instead, the valve performance control apparatus according to this invention may be adapted to an engine whose VVTs are designed to change only the timings of opening both valves 23 and 24 or only the timings of closing both valves 23 and 24.

In the first embodiment, the compensation deviations ΔVTK1, ΔVTK2 corresponding to the deviations ΔVT1, ΔVT2 are computed based on the function data shown in FIG. 6. The relation between the deviations ΔVT1, ΔVT2 and the compensation deviations ΔVTK1, ΔVTK2 may be stored as a function map in the ROM 86 for each engine speed NE and each manifold pressure PM. This enables the compensation deviations ΔVTK1, ΔVTK2 corresponding to the deviations ΔVT1, ΔVT2 to be computed based on the function map.

In the first embodiment, the valve timing of the intake valve 23 is changed by giving priority to the deviation ΔVT1 of the intake camshaft 11 when computing the compensation deviations ΔVTK1, ΔVTK2 from the deviations ΔVT1, ΔVT2, respectively. Function data as shown in FIG. 13 may however be stored in the ROM 86 so that the duty ratios DVT1 and DVT2 are calculated based on this function data.

Figure 13:
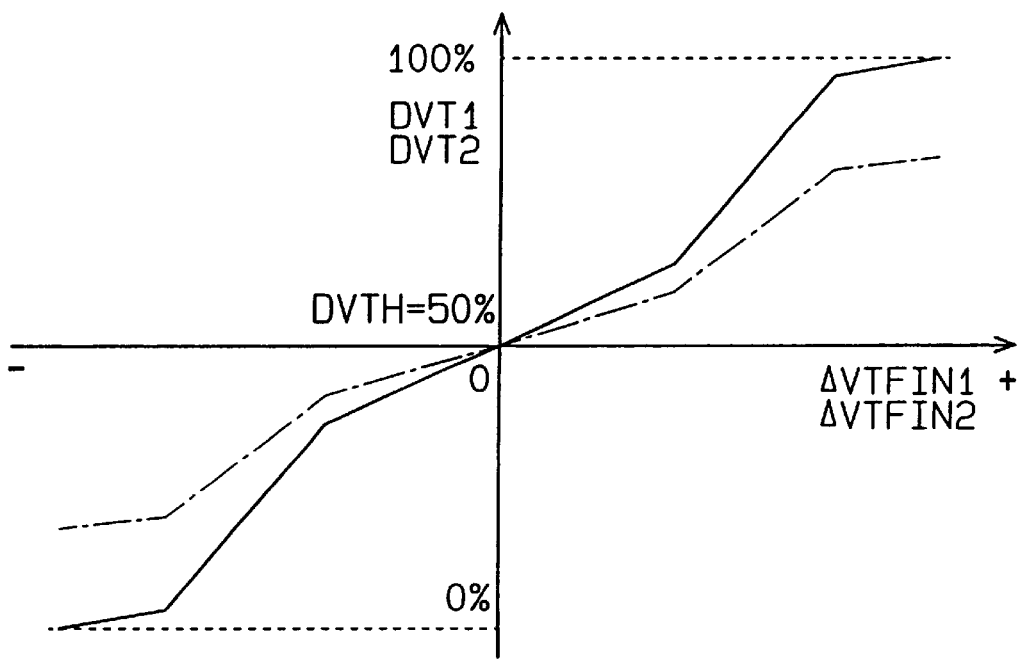
FIG. 13 is a graph showing the relation between the final deviation and the duty ratio in a further embodiment according to the present invention.

In FIG. 13, the solid line shows the relation between the final deviation ΔVTFIN1 and the duty ratio DVT1, and the single-dotted line shows the relation between the final deviation ΔVTFIN2 and the duty ratio DVT2. As the duty ratios DVT1, DVT2 are computed based on the function data, the duty ratio DVT1 for controlling the intake OCV 60 is computed to be greater than the duty ratio DVT2 for controlling the exhaust OCV 80 even when the final deviations ΔVTFIN1, ΔVTFIN2 are the same. This further embodiment therefore changes the valve timing of the intake valve 23 by giving priority to the valve 23 that contributes more to increasing the output torque of the engine 10 in the same manner as the first embodiment.

Therefore, the present examples and embodiments are to be considered as illustrative and not restrictive and the invention is not to be limited to the details given herein, but may be modified within the scope of the appended claims.

What is claimed is:

1. An apparatus for controlling a valve performance for an internal combustion engine, said engine having a combustion chamber communicating with an air intake passage and an air exhaust passage, said intake passage having an air intake valve that is selectively open and closed to control airflow passing in the intake passage to the combustion chamber, said exhaust passage having an air exhaust valve that is selectively open and closed to control exhaust gas flow passing in the exhaust passage from the combustion chamber, each of said valves being actuated by a camshaft based on valve performance affecting opening and closing timing and a lift amount of the valve, said apparatus comprising:

first changing means for changing the valve performance of the intake valve, said first changing means being actuated by fluid pressure;

second changing means for changing the valve performance of the exhaust valve, said second changing means being actuated by the fluid pressure;

a fluid source connected with the first changing means and the second changing means to supply fluid to said first changing means and said second changing means;

means for adjusting amount of the fluid supplied from the fluid source to said first changing means and said second changing means;

means for detecting the running condition of the engine; and means for controlling said adjusting means to change each valve performance so as to coincide the engine torque with desired engine torque, said control means includes means for selecting one of the valves based on the detected running condition of the engine, said selected valve being capable of coinciding said engine torque with desired torque faster than the other one of valves to allow larger amount of the fluid supplied to one of the changing means that is associated with the selected valve than the other one of the changing means.

2. The apparatus as set forth in claim 1, wherein said control means includes:

first computing means for computing target valve performances of the intake valve and the exhaust valve based on the detected running condition of the engine;

second computing means for computing a first deviation existing between said target valve performance and said valve performance relating to the intake valve, a second deviation existing between said target valve performance and said valve performance relating to the exhaust valve; and said selecting means selecting one of the valves capable of changing the engine torque at a larger degree than the other one of the valve.

3. The apparatus as set forth in claim 2, wherein said selecting means includes:

means for respectively multiplying said deviations by predetermined compensation coefficients;

means for setting one of said compensation coefficients larger than the other one of said compensation coefficients, said one of the compensation coefficients relates to the engine torque changed at the larger degree; and means for specifying one of the valves with the larger deviation multiplied by the predetermined coefficient.

4. The apparatus as set forth in claim 3, wherein said control means controls the adjusting means to increase the amount of fluid supplied to the changing means that changes the specified valve in proportion to the deviation multiplied by the predetermined coefficient.

5. The apparatus as set forth in claim 1, wherein said control means operates one of the changing means to supply the fluid to the associated valve, and wherein said control means operates the other one of the changing means to stop supplying the fluid to the associated valve.

6. The apparatus as set forth in claim 2, wherein said selecting means includes:

means for respectively comparing the deviations to predetermined reference values;

means for setting one of said reference values smaller than the other one of said reference values, said one of the reference values relates to the engine torque changed at the larger degree; and means for specifying one of the valves capable of changing the engine torque at the larger degree when the deviation relating to one of the valves is larger than the reference value and the deviation relating to the other one of valve is smaller than the reference value.

7. The apparatus as set forth in claim 1 further comprising:

said first changing means changing the open and close timing of the intake valve; and said second changing means changing the open and close timing of the exhaust valve.

8. The apparatus as set forth in claim 4 further comprising:

said first changing means being arranged to selectively advance and retard the open and close timing of the intake valve; and said second changing means being arranged to selectively advance and retard the open and close timing of the exhaust valve.

9. The apparatus as set forth in claim 5 further comprising:
a first camshaft for selectively opening and closing the intake valve; and
a second camshaft for selectively opening and closing the exhaust valve;
wherein said first changing means changes a rotation phase of the first camshaft to cause a change of the open and close timing of the intake valve, and wherein said second changing means changes a rotation phase of the second camshaft to cause a change of the open and close timing of the exhaust valve.

10. The apparatus as set forth in claim 6, wherein said first changing means includes:
a first rotating body coupled to the crankshaft;
a second rotating body disposed in the first rotating body and coupled to the first camshaft;
a first actuating member disposed between the first rotating body and the second rotating body and axially movable with respect to the first camshaft to change the rotation phase of the first camshaft with respect to the rotation phase of the crankshaft; and
a first pressure chamber and a second pressure chamber disposed adjacent to each other with respect to the first actuating member to axially shift the first actuating member;
and wherein said second changing means includes:
a third rotating body coupled to the crankshaft;
a fourth rotating body disposed in the third rotating body and coupled to the second camshaft;
a second actuating member disposed between the third rotating body and the fourth rotating body and axially movable with respect to the second camshaft to change the rotation phase of the second camshaft with respect to the rotation phase of the crankshaft; and
a third pressure chamber and a fourth pressure chamber disposed adjacent to each other with respect to the second actuating member to axially shift the second actuating member.

11. The apparatus as set forth in claim 1, wherein said detecting means includes:
a first sensor for detecting engine speed; and
a second sensor for detecting amount of the air supplied to the engine.

12. The apparatus as set forth in claim 1 further comprising:
a first fluid passage connecting the first changing means with the fluid source to allow the fluid to flow therein to the first changing means from the fluid source;
a second fluid passage connecting the second changing means with the fluid source to allow the fluid to flow therein to the second changing means from the fluid source; and
said adjusting means including a valve for distributing the fluid to the first fluid passage and the second fluid passage, said valve being actuated by a signal from the control means.

* * * * *

UNITED STATES PATENT AND TRADEMARK OFFICE
CERTIFICATE OF CORRECTION

PATENT NO. : 5,769,044
DATED : 23 June 1998
INVENTOR(S) : Yoshihito MORIYA

It is certified that error appears in the above-identified patent and that said Letters Patent is hereby corrected as shown below:

IN THE TITLE, after "[54]" change "VALUE" to --VALVE--.

| Column | Line | |
|---|---|---|
| 1 | 1 | Change "VALUE" to --VALVE--. |
| 1 | 18 | Change "communicates" to --communicated--. |
| 18 | 18 | Change "become" to --becomes--; change "case" to --cases in--. |
| 20 | 23 | Change "valve" to --valves--. |
| 20 | 58 | Change "valve" to --the valves--. |
| 19 | 63 | Before "amount" insert --the--. |

UNITED STATES PATENT AND TRADEMARK OFFICE
CERTIFICATE OF CORRECTION

PATENT NO. : 5,769,044

DATED : 23 June 1998

INVENTOR(S) : Yoshihito MORIYA

It is certified that error appears in the above-identified patent and that said Letters Patent is hereby corrected as shown below:

Column 22, line 15, Before "amount" insert --the--.

Signed and Sealed this

Seventeenth Day of November, 1998

Attest:

BRUCE LEHMAN

*Attesting Officer*　　　*Commissioner of Patents and Trademarks*

UNITED STATES PATENT AND TRADEMARK OFFICE
CERTIFICATE OF CORRECTION

PATENT NO. : 5,769,044
DATED : 23 June 1998
INVENTOR(S) : Yoshihito MORIYA

It is certified that error appears in the above-identified patent and that said Letters Patent is hereby corrected as shown below:

| Column | Line | | |
|--------|------|---|---|
| 10 | 64 | should read -- | $\Delta VTK2$ -- |
| 11 | 11 | should read -- | $\Delta VTK1$ -- |

Signed and Sealed this

Thirteenth Day of July, 1999

Attest:

Q. TODD DICKINSON

Attesting Officer        Acting Commissioner of Patents and Trademarks

UNITED STATES PATENT AND TRADEMARK OFFICE
CERTIFICATE OF CORRECTION

PATENT NO. : 5,769,044
DATED : June 23, 1998
INVENTOR(S) : Yoshihito Moriya

It is certified that error appears in the above-identified patent and that said Letters Patent is hereby corrected as shown below:

Column 10, line 64, Change "$\Delta VTK2$" (second occurrence) to --$\Delta VTK2$--.

Column 11, line 11, Change "$\Delta VTK1$" (second occurrence) to --$\Delta VTK1$--.

This certificate supersedes Certificate of Correction issued July 13, 1999.

Signed and Sealed this

Twenty-first Day of September, 1999

Q. TODD DICKINSON

*Attest:*

*Attesting Officer*      *Acting Commissioner of Patents and Trademarks*